US012718751B2

(12) United States Patent
Oh et al.

(10) Patent No.: US 12,718,751 B2
(45) Date of Patent: Aug. 25, 2026

(54) DISPLAY APPARATUS CORRECTING AFTERIMAGE AREA

(71) Applicant: LG Display Co., Ltd., Seoul (KR)

(72) Inventors: SeRi Oh, Gyeonggi-do (KR); JungHyun Ham, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 366 days.

(21) Appl. No.: 18/125,574

(22) Filed: Mar. 23, 2023

(65) Prior Publication Data

US 2023/0316997 A1 Oct. 5, 2023

(30) Foreign Application Priority Data

Mar. 31, 2022 (KR) ........................ 10-2022-0040628

(51) Int. Cl.
*G09G 3/3208* (2016.01)
*G09G 3/20* (2006.01)

(52) U.S. Cl.
CPC ......... *G09G 3/3208* (2013.01); *G09G 3/2096* (2013.01); *G09G 2320/0242* (2013.01); *G09G 2320/0257* (2013.01); *G09G 2320/0285* (2013.01); *G09G 2320/0666* (2013.01); *G09G 2320/0693* (2013.01)

(58) Field of Classification Search
CPC ..... G09G 3/2003; G09G 3/2092–2096; G09G 3/30–3291; G09G 5/02; G09G 5/06; G09G 2320/0233; G09G 2320/0242; G09G 2320/0257; G09G 2320/0285; G09G 2320/043–048; G09G 2320/0613; G09G 2320/0666; G09G 2320/0686; G09G 2320/0693; G09G 2320/10–106; G09G 2340/06; G09G 2340/16; G09G 2360/16
See application file for complete search history.

(56) References Cited

U.S. PATENT DOCUMENTS

2009/0046042 A1 2/2009 Tsai et al.
2012/0169789 A1* 7/2012 Origuchi .............. G09G 3/2965 345/63
2016/0232651 A1* 8/2016 Koyama ................... G06T 5/94
2020/0202772 A1* 6/2020 Ji ......................... G09G 3/3208
2021/0225327 A1* 7/2021 Matsumoto .............. G09G 5/10
2021/0272495 A1* 9/2021 Park ....................... H04N 5/205
2022/0076643 A1* 3/2022 Shan ...................... G09G 3/3607
2022/0147124 A1* 5/2022 Choi ....................... G09G 3/001
2022/0188977 A1* 6/2022 Lee ......................... G06T 3/40
(Continued)

FOREIGN PATENT DOCUMENTS

JP 2009-267967 A 11/2009
JP 2012-58849 A 3/2012
(Continued)

*Primary Examiner* — Keith L Crawley
(74) *Attorney, Agent, or Firm* — Birch, Stewart, Kolasch & Birch, LLP

(57) ABSTRACT

A display apparatus can include an afterimage detecting part configured to detect a first data of an afterimage area from an image data, a saturation adjusting part configured to adjust a saturation of the first data of the afterimage area detected by the afterimage detecting portion and convert the first data into a second data, and a display panel including a plurality of pixels configured to display a data including the second data output from the saturation adjusting part.

27 Claims, 11 Drawing Sheets

(56) References Cited

U.S. PATENT DOCUMENTS

| | | | | |
|---|---|---|---|---|
| 2022/0208055 | A1* | 6/2022 | Lim | G09G 3/20 |
| 2024/0153451 | A1* | 5/2024 | Choi | G06N 20/00 |
| 2024/0161452 | A1* | 5/2024 | Huang | G06V 10/60 |

FOREIGN PATENT DOCUMENTS

| | | | |
|---|---|---|---|
| KR | 10-2017510 | B1 | 8/2019 |
| KR | 10-2019-0126664 | A | 11/2019 |
| KR | 10-2020-0078293 | A | 7/2020 |

* cited by examiner

DISPLAY APPARATUS CORRECTING AFTERIMAGE AREA

CROSS-REFERENCE TO RELATED APPLICATION

This application claims the priority benefit of Korean Patent Application No. 10-2022-0040628, filed on Mar. 31, 2022 in the Republic of Korea, the entire contents of this Korean application being hereby expressly incorporated by reference into the present application.

BACKGROUND

Technical Field

The present disclosure relates to a display apparatus.

Discussion of the Related Art

There are various kinds of display apparatuses being developed. Among the display apparatuses, an electroluminescent display apparatus has been widely used.

Among the electroluminescent display apparatuses, an organic light emitting display apparatus utilizes a self-luminous element, whereby there is no need for a separate light source. In addition, the organic light emitting display apparatus has advantages of low power consumption, thin profile, wide viewing angle, and rapid response speed.

The organic light emitting display apparatus can include a plurality of pixels and can display images of various colors through the pixels. For example, the organic light emitting display apparatus can display images by supplying a predetermined current to the plurality of pixels according to image data. An organic light emitting element included in the organic light emitting display apparatus may deteriorate according to an electrical stress and passage of emission time. The deterioration of the organic light emitting element can cause an afterimage issue which appears as if an image is left even though an image is not output. However, if luminance is adjusted to address the afterimage issue, a luminance deviation may occur, whereby image quality may be degraded or the afterimage limitation may occur due to non-uniformity of luminance.

SUMMARY OF THE DISCLOSURE

The inventors of the present disclosure have recognized the issues and other limitations that are described above and are associated with the related art, and have performed various experiments to solve or address an afterimage limitation without deterioration of picture quality. Through the various experiments, the inventors of the present disclosure have invented an improved display apparatus capable of solving or minimizing an afterimage limitation without deterioration of picture quality.

An aspect the present disclosure is to provide a display apparatus capable of—solving or minimizing an afterimage limitation without deterioration of picture quality.

Another aspect of the present disclosure is to provide a display apparatus capable of solving or addressing an afterimage limitation without deterioration of picture quality and improving a lifespan.

Accordingly, embodiments of the present disclosure are directed to an apparatus that substantially obviates one or more of the problems due to limitations and disadvantages of the related art.

Additional features and aspects will be set forth in the description that follows, and in part will be apparent from the description, or can be learned by practice of the inventive concepts provided herein. Other features and aspects of the inventive concepts can be realized and attained by the structure particularly pointed out in the written description, or derivable therefrom, and the claims hereof as well as the appended drawings.

To achieve these and other aspects of the inventive concepts, as embodied and broadly described herein, a display apparatus comprises an afterimage detecting part configured to detect a first data of an afterimage area from an image data, a saturation adjusting part configured to adjust a saturation of the first data of the afterimage area detected by the afterimage detecting part, and convert the first data into a second data, and a display panel including a plurality of pixels configured to display a data including the second data output from the saturation adjusting part.

In another aspect of the present disclosure, a display apparatus comprises a display panel including a plurality of pixels, a controller configured to receive an image data, detect a first data of an afterimage area from the image data by accumulating a data difference for each pixel between adjacent frames by the image data, adjust a saturation correction value based on the first data of the afterimage area, correct the first data of the afterimage area to a second data based on the saturation correction value, and supply an output data including the second data, and a circuit part configured to provide data signals to the plurality of pixels based on the output data supplied from the controller.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
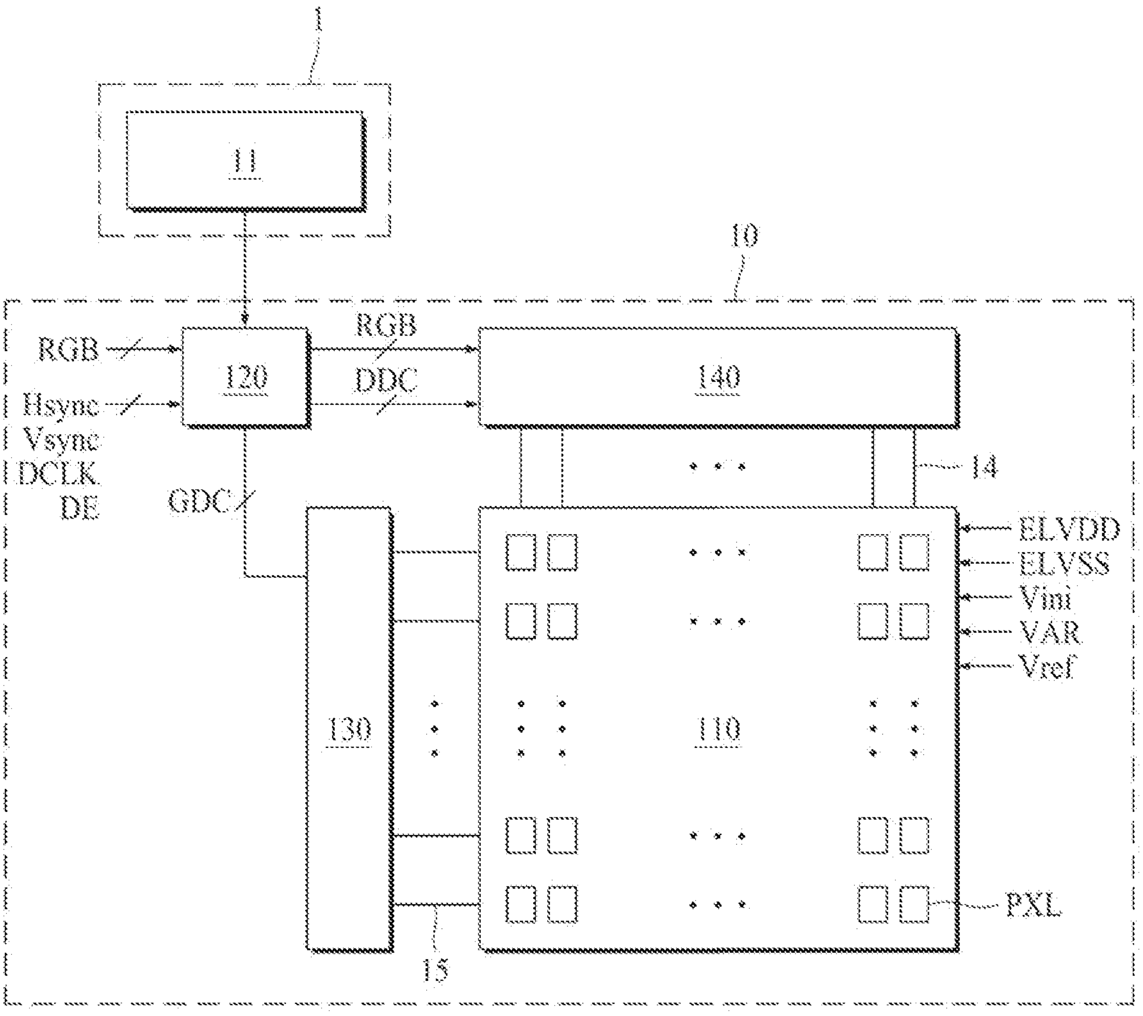
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Same reference numerals designate same elements throughout. Names of the respective elements used in the following explanations are selected only for convenience of writing the specification and can be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used. In the description of embodiments, when a structure is described as being positioned "on or above" or "under or below" another structure, this description should be construed as including a case in which the structures contact each other as well as a case in which a third structure is disposed therebetween.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, sequence or number of the corresponding elements should not be limited by these terms. The expression that an element or layer is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in a co-dependent relationship.

Hereinafter, embodiments of the present disclosure will be described in detail with reference to the accompanying drawings. All components of each display apparatus according to all embodiments of the present disclosure are operatively coupled and configured. Further, for convenience of description, a scale, size and thickness of each of elements illustrated in the accompanying drawings differs from a real scale, size and thickness, and thus, embodiments of the present disclosure are not limited to a scale, size and thickness illustrated in the drawings.

FIG. 1 illustrates a display apparatus according to an embodiment of the present disclosure.

A display apparatus according to one or more embodiments of the present disclosure can be a liquid crystal display apparatus, an electroluminescent display apparatus, or the like. The electroluminescent display apparatus can be an organic light emitting display apparatus, a quantum dot display apparatus, an inorganic light emitting display apparatus, and the like. Hereinafter, an organic light emitting display apparatus will be described as an example.

Referring to FIG. 1, a display apparatus according to an embodiment of the present disclosure can include a system board 1 and a display module 10.

The system board 1 can include an image supply part 11. The image supply part 11 can supply an image data.

The display module 10 according to an embodiment of the present disclosure can comprise a display panel 110 and a timing controller 120. For example, the display module 10 can include the display panel 110 including a plurality of pixels PXL, a data driver 140 for driving data lines 14, a gate driver 130 for driving gate lines 15, and a timing controller 120 for controlling driving timings of the data driver 140 and the gate driver 130.

The display panel 110 can include a display area and a non-display area. The non-display area can be an area in which an image is not displayed. The non-display area can be a bezel area, but not limited thereto.

The display panel 110 can include a pixel array in a pixel area (or a display area) formed by the data line 14 and/or the gate line 15. The pixel array can include the plurality of pixels PXL configured to display an image. For example, the display area can be an area in which the plurality of pixels PXL are disposed to display an image. Each pixel PXL includes a plurality of subpixels. Each of subpixels can include an emission element and a driving circuit for independently driving the emission element. A shape in which each of the subpixels is arranged in each pixel area is not limited to a matrix shape, and can be variously arranged in a stripe shape, a shape for sharing a pixel, and the like.

For example, each subpixel can be connected to one data line 14, at least one or more scan lines, and an emission control line. The subpixels can be commonly supplied with a high-potential voltage ELVDD, a low-potential voltage ELVSS, and a reference voltage Vref from a power generator. The reference voltage Vref can be within a voltage range sufficiently lower than an operation voltage of the emission element so as to prevent unnecessary light emission of the emission element in an initialization period and a sampling period, and can be adjusted to be equal to or lower than the low-potential voltage ELVSS. The subpixels can be commonly supplied with an initialization voltage Vini and a reset voltage VAR from the power generator.

Thin film transistors TFTs constituting the subpixel can be implemented as an oxide transistor (or oxide TFT) including an oxide semiconductor layer. The oxide TFT can be advantageous for a large area of the display panel 110 in consideration of both electron mobility and process variation (or process margin). Embodiments of the present disclosure are not limited thereto, and a semiconductor layer of the TFT can be formed of amorphous silicon, polysilicon, or the like.

Each of the subpixels can include a plurality of TFTs and a storage capacitor to compensate for a deviation of a threshold voltage Vth of a driving TFT.

For example, the pixel array can include three subpixels outputting light of red, green, and blue, respectively. For example, the pixel array can include four subpixels outputting light of white, red, green, and blue, respectively. For example, the pixel array can include at least three subpixels among white, red, green, and blue subpixels. For example, the pixel array can include subpixels of red, green, and blue combinations, subpixels of white, red, and green combinations, subpixels of blue, white, and red combinations, and subpixels of green, blue, and white combinations, or can be composed of subpixels of white, red, green, and blue combinations.

The timing controller 120 can output an image data supplied from the image supply part 11. The data driver 140 converts the image data supplied from the timing controller 120 into a data voltage and applies the data voltage to the data lines 14 of the display panel 110. The gate driver 130 can drive the gate lines 15 of the display panel 110 under the control of the timing controller 120.

The timing controller 120 can realign digital image data RGB supplied from the image supply part 11 according to a resolution of the display panel 110 and can supply the rearranged digital image data to the data driver 140. The timing controller 120 can generate a data control signal DDC for controlling an operation timing of the data driver 140 and a gate control signal GDC for controlling an operation timing of the gate driver 130 based on timing signals such as a vertical synchronization signal Vsync, a horizontal synchronization signal Hsync, a dot clock signal DCLK, and a data enable signal DE supplied from the image supply part 11.

The data driver 140 can convert the digital image data RGB input from the timing controller 120 into an analog data voltage based on the data control signal DDC and can supply the analog data voltage to the plurality of data lines 14.

The gate driver 130 can generate a scan signal and an emission signal (or emission control signal) based on the gate control signal GDC. The gate driver 130 can include a scan driver and an emission signal driver. The scan driver can generate the scan signal in a row sequential manner to drive at least one scan line connected to each pixel row and can supply the scan signal to the scan lines. The emission signal driver can generate the emission signal in a row sequential manner to drive at least one emission signal line connected to each pixel row and can supply the emission signal to the emission signal lines.

According to an embodiment of the present disclosure, the gate driver 130 can be embedded in the non-display area of the display panel 110 according to a gate-driver In Panel GIP method, but not limited thereto. According to another embodiment of the present disclosure, the gate driver 130 can be divided into a plurality of portions and the portions of the gate driver 130 can be arranged on at least two side portions of the display panel 110.

The light emitting display apparatus can display an image by supplying a predetermined current to the plurality of pixels according to an image data. When a high current is continuously supplied to at least one pixel, deterioration occurs in at least one or more subpixels. Further, even when an image is not output, an afterimage recognized as if an image remains is generated.

To solve or address the afterimage limitation, the light emitting display apparatus can reduce the deterioration due to a luminance deviation by changing a luminance value of each sub pixel according to a deterioration degree of each emission element. However, it is recognized that it may be possible for an image quality to deteriorate.

In another method for solving or addressing the afterimage limitation, luminance and saturation can be changed by correcting red, green, and blue RGB data at a predetermined ratio. The method can detect a fixed area in an image, obtain the RGB data of the detected fixed area, and reduce saturation of the fixed area based on the RGB data, to thereby address the afterimage. However, even in this case, it is recognized that luminance and saturation are changed, which may deteriorate an image quality.

Accordingly, the inventors of the present disclosure have various experiments for solve the afterimage without deterioration of image quality. The present disclosure provides the display apparatus capable of solving or addressing the afterimage limitation without deteriorating image quality through various experiments. This will be described below.

Figure 2:
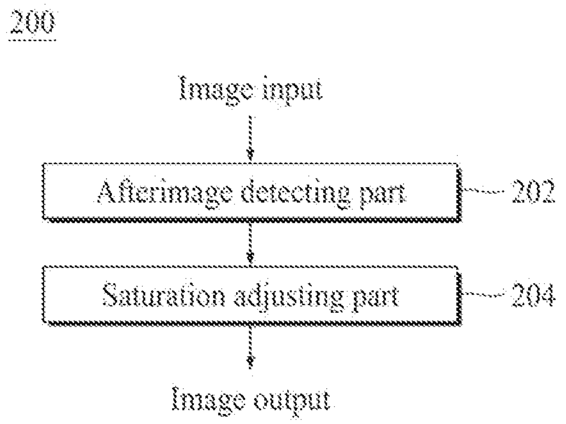
FIG. 2 is a block diagram illustrating a configuration of an image processor of the display apparatus according to an embodiment of the present disclosure.

FIG. 2 is a block diagram illustrating a configuration of an image processor of the display apparatus according to an embodiment of the present disclosure.

Referring to FIGS. 1 and 2, the display apparatus according to an embodiment of the present disclosure can include an image processor 200 and a display panel 110. The display panel 110 can include a plurality of pixels PXL.

An emission element of each pixel PXL constituting the display panel 110 can include one or more light emitting parts between an anode electrode and a cathode electrode on a substrate. The substrate can be formed of an insulating material to support various components of the display panel. The substrate can be formed of glass having rigidity, a substrate formed of a polymer resin, or a substrate formed of a film having flexibility, but not limited thereto. For example, the flexible film can be a plastic and a polyimide, but embodiments of the present disclosure are not limited thereto.

When the display panel 110 is applied to a flexible display apparatus, the display panel 110 can be formed of a flexible material such as a plastic. Further, when the emission element which is easily implemented to be flexible is applied to a vehicle lighting apparatus or a vehicle display apparatus, various designs and design freedom for the vehicle lighting apparatus or vehicle display apparatus can be secured according to the structure of the vehicle or the shape of the exterior. For example, the display panel 110 according to an embodiment of the present disclosure can be a display panel with a bezel bending by a flexible substrate for an organic light emitting display panel and a lower backplate support structure.

The display apparatus according to an embodiment of the present disclosure can be applied to a display apparatus including a TV (television), a mobile, a tablet PC (personal computer), a monitor, a laptop computer, a display apparatus for a vehicle, and the like. Alternatively, the display apparatus can be applied to a wearable display apparatus, a foldable display apparatus, a rollable display apparatus, and a bendable display apparatus. When the substrate is a flexible substrate, the display apparatus can be applied to a flexible display apparatus, a foldable display apparatus, a rollable display apparatus, a bendable display apparatus, a wearable display apparatus, a variable display apparatus, and an automotive display apparatus, and embodiments of the present disclosure are not limited thereto.

The anode can be arranged to be spaced apart from each other for each pixel PXL. The anode can be formed of a transparent conductive material having a high work function. For example, the transparent conductive material can include indium tin oxide ITO, indium zinc oxide IZO, or the like, and embodiments of the present disclosure are not limited thereto.

When the display panel 110 according to an embodiment of the present disclosure is a top emission type, the anode can further include a reflective layer so that light emitted from a light emitting layer constituting the light emitting part is reflected to the anode and emitted in an upward direction more smoothly. For example, the anode can have a two-layered structure in which a transparent conductive layer formed of a transparent conductive material and a reflective layer are sequentially stacked, or a three-layered structure in which a transparent conductive layer, a reflective layer, and a transparent conductive layer are sequentially stacked, but embodiments of the present disclosure are not limited thereto. The reflective layer can be formed of silver (Ag) or alloy including sliver (Ag), for example, silver or APC (Ag/Pd/Cu), and embodiments of the present disclosure are not limited thereto.

The cathode can be disposed on the anode. The cathode can supply electrons to the light emitting layer of the light emitting part. Since the cathode needs to supply electrons, the cathode can be formed of a conductive material having a low work function. For example, the cathode can be formed of silver (Ag), titanium (Ti), aluminum (Al), molybdenum (Mo), magnesium (Mg), silver-magnesium (Ag:Mg), and magnesium Mg and lithium fluoride (Mg:LiF), and embodiments of the present disclosure are not limited thereto. In addition, the cathode can be composed of at least two or more layers, and embodiments of the present disclosure are not limited thereto.

According to an embodiment of the present disclosure, when the display panel 110 is a top emission type, the cathode can be an transparent conductive oxide such as an indium tin oxide (ITO), an indium zinc oxide (IZO), an indium tin zinc oxide (ITZO), a zinc oxide (ZnO), and a tin oxide (TO), and embodiments of the present disclosure are not limited thereto.

One or more light emitting parts can be disposed between the anode and the cathode. The light emitting part can include organic layers. For example, the light emitting part can include a light emitting layer (EML) and at least one or more organic layers. For example, at least one or more organic layers can include a hole injection layer (HIL), a hole transport layer (HTL), a hole blocking layer (HBL), an electron blocking layer (EBL), and an electron transport layer (ETL), but embodiments of the present disclosure are not limited thereto. An electron injection layer (EIL) can be further formed on the electron transport layer, and embodiments of the present disclosure are not limited thereto. A capping layer can be further formed on the cathode, and embodiments of the present disclosure are not limited thereto. For example, the hole injection layer, the hole transport layer, and the electron blocking layer can be hole transfer layers, and embodiments of the present disclosure are not limited thereto. For example, the electron injection layer, the electron transport layer, and the hole blocking layer can be electron transfer layers, and embodiments of the present disclosure are not limited thereto.

One light emitting part can include a red light emitting layer, a green light emitting layer, and a blue light emitting layer which emit red, green, and blue light for each pixel PXL.

The two or more light emitting parts can include a first light emitting part and a second light emitting part. The first light emitting part and the second light emitting part can include a red light emitting layer, a green light emitting layer, and a blue light emitting layer which emit red, green, and blue light for each subpixel. The two or more light emitting layers included in the first light emitting part and the second light emitting part can be light emitting layers which emit the same color of light.

For another example, the first light emitting layer included in the first light emitting part can be a blue light emitting layer, a sky blue light emitting layer, a dark blue light emitting layer, a blue light emitting layer and a red light emitting layer, a sky blue light emitting layer and a red light emitting layer, and a dark blue light emitting layer and a red light emitting layer, and embodiments of the present disclosure are not limited thereto. For example, the second light emitting layer included in the second light emitting part can be a combination of a yellow light emitting layer, a yellow-green light emitting layer, a green light emitting layer, a yellow light emitting layer and a red light emitting layer, a combination of a yellow-green light emitting layer and a red light emitting layer, a combination of a green light emitting layer and a red light emitting layer, a yellow light emitting layer, a combination of a yellow-green light emitting layer, and a green light emitting layer, a combination of a yellow light emitting layer, a yellow-green light emitting layer, a green light emitting layer, and a red light emitting layer, a combination of two yellow-green light emitting layers and one green light emitting layer, a combination of two yellow-green light emitting layers, one green light emitting layer, and a red light emitting layer, or a combination of one yellow-green light emitting layer, two green light emitting layers, and a red light emitting layer, and embodiments of the present disclosure are not limited thereto. A charge generation layer can be formed between the first light emitting part and the second light emitting part. The charge generation layer can include an N-type charge generation layer and a P-type charge generation layer. Each of the first light emitting part and the second light emitting part can include at least one or more of a hole injection layer, a hole transport layer, a hole blocking layer, an electron blocking layer, an electron transport layer, and an electron injection layer, and embodiments of the present disclosure are not limited thereto.

The two or more light emitting parts can include a first light emitting part, a second light emitting part, and a third light emitting part. The first light emitting layer included in the first light emitting part can be the same as described above. The second light emitting layer included in the second light emitting part can be the same as described above. The third light emitting layer included in the third light emitting part can be configured to be the same as the first light emitting layer, and embodiments of the present disclosure are not limited thereto. A first charge generation layer can be formed between the first light emitting part and the second light emitting part. The first charge generation layer can include an N-type charge generation layer and a P-type charge generation layer. A second charge generation layer can be formed between the second light emitting part and the third light emitting part. The second charge generation layer can include an N-type charge generation layer and a P-type charge generation layer. Each of the first light emitting part, the second light emitting part, and the third light emitting part can include at least one or more of a hole injection layer, a hole transport layer, a hole blocking layer, an electron blocking layer, an electron transport layer, and an electron injection layer, and embodiments of the present disclosure are not limited thereto.

An encapsulation part can be disposed to cover the emission element. The encapsulation part can protect the emission element from external foreign matter, shock, penetration of moisture ($H_2O$) or oxygen ($O_2$), or the like. The encapsulation part can be formed of three or more layers such as a first inorganic insulating layer, an organic insulating layer, and a second inorganic insulating layer. The encapsulation part can have an inclined surface at an outer edge (or an outer periphery) of the display area or in the non-display area.

An upper substrate can be further disposed on the encapsulation part. The upper substrate can be formed of a flexible film formed of glass, a metal material, or a polyimide-based material. The substrate and the upper substrate can be fixed to each other by the encapsulation part.

A touch part for sensing a user's touch can be disposed on the encapsulation part. The touch part can include a first touch insulating layer, a touch electrode portion, and a second touch insulating layer. For example, the first touch insulating layer can be a lower insulating layer or a lower touch insulating layer, and the second touch insulating layer can be an upper insulating layer or an upper touch insulating layer, but not limited thereto.

The touch electrode part can include a plurality of touch electrodes for sensing a user's touch. The plurality of touch electrodes can serve as a touch sensor for sensing a user's touch according to a mutual-capacitance method or a self-capacitance method. The touch electrode part can include a plurality of first touch electrodes arranged in a first direction on the same plane and a plurality of second touch electrodes arranged in a second direction perpendicular to the first direction. The plurality of first touch electrodes can be a touch signal transmission electrode, a touch TX electrode, or the like, and the plurality of second touch electrodes can be a touch signal reception electrode, a touch RX electrode, or the like, and the terms are not limited thereto.

The touch electrode part according to an embodiment of the present disclosure can be implemented as a touch panel including the plurality of touch electrodes. For example, when the emission element has a top emission structure, the touch panel of add-on type can be disposed on or coupled to the encapsulation part or an optical film. When the emission element has a bottom emission structure, the touch panel of add-on type can be disposed on or coupled to a rear surface of the substrate.

The touch electrode part according to another embodiment of the present disclosure can be directly formed on the encapsulation part according to an in-cell method. For example, the in-cell type touch electrode part can be directly formed on the front surface of the encapsulation part when the emission element has a top emission structure.

A first touch connection electrode for connecting the plurality of first touch electrodes to each other can be formed on the first touch insulating layer. For example, the first touch connection electrode and the second touch connection electrode are arranged on different planes so that electrical connection is not made, and each of the plurality of touch electrodes can be electrically connected to each other. The first touch connection electrode or second touch connection electrode can be a touch electrode connection wiring, a touch bridge electrode, a touch bridge wiring, or the like, and the terms are not limited thereto.

Touch wirings can be arranged on the non-display area to apply an electric signal to the touch electrode part of the touch part in the display area. The touch wiring can be a touch connection wiring, a touch routing wiring, or the like, and the terms are not limited thereto.

Referring to FIG. 2, the image processor 200 can include an afterimage detecting part 202 and a saturation adjusting part 204. The image processor 200 can be embedded in any one of the image supply part 11, the timing controller 120, and the data driver 140 shown in FIG. 1. The afterimage detecting part 202 can detect an afterimage area, for example, a first data of a first area, in which an accumulated average value of a data difference for each pixel between adjacent frames is smaller than a reference value during a plurality of frames from an input image data.

The saturation adjusting part 204 can adjust saturation of the first data of the afterimage area detected by the afterimage detecting part 202 to convert the first data into a second data. The saturation adjusting part 204 can output data of an area which is not detected as the afterimage area, for example, a third data of a second area (or general area or normal area) without conversion.

The image processor 200 can output an image data including the second data of the afterimage area and the third data of the normal area output from the saturation adjusting part 204. The display panel 110 can display the image data output from the image processor 200.

Figure 3:
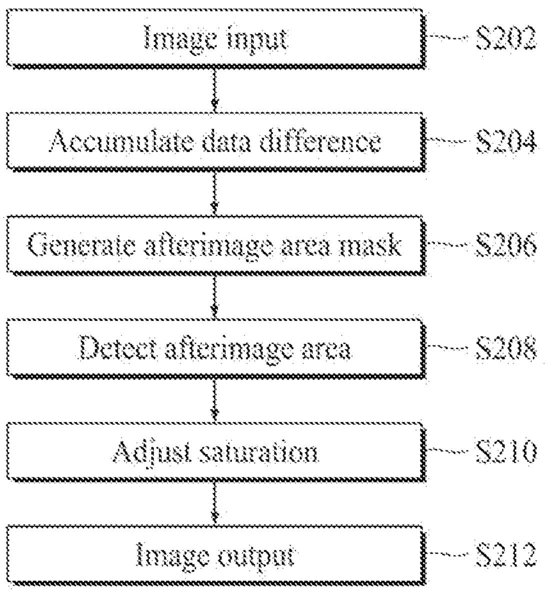
FIG. 3 illustrates an image processing method of the display apparatus according to an embodiment of the present disclosure.
Figure 4A:
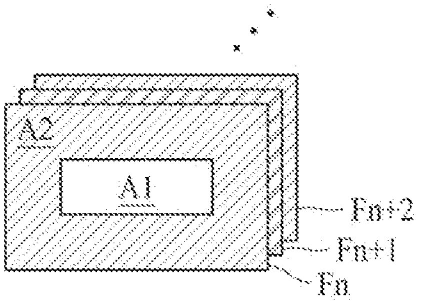
FIGS. 4A to 4C illustrate an afterimage detection method according to an embodiment of the present disclosure.
Figure 4B:
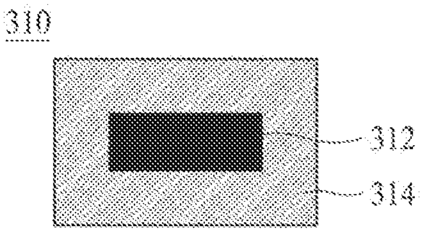
Figure 4C:
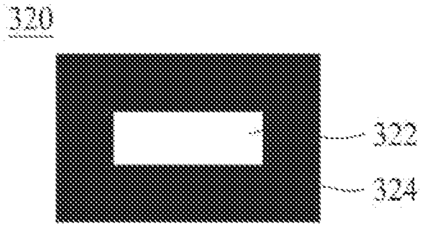

FIG. 3 illustrates an image processing method of the display apparatus according to an embodiment of the present disclosure. FIGS. 4A to 4C illustrate an afterimage detection method according to an embodiment of the present disclosure.

The image processing method shown in FIG. 3 and the afterimage detection method shown in FIGS. 4A to 4C are described in conjunction with the image processor 200 shown in FIG. 2.

Referring to FIGS. 2 and 3, the image processor 200 receives and inputs an image data (S202).

The afterimage detecting part 202 can detect a first data of the afterimage area in which the afterimage can occur according to electrical stress and light emission time of the emission element in each pixel PXL in the display panel 110 from the input image data (S208).

For example, the afterimage detecting part 202 can accumulate data differences for each pixel between adjacent frames by the input image data (S204). The afterimage detecting part 202 can generate an afterimage area mask for detecting the afterimage area by using the accumulated average value of the data differences between frames (S206). The afterimage detecting part 202 can detect the first data of the afterimage area from the image data by the generated afterimage area mask (S208). For example, the afterimage detecting part 202 may mask an area in which an accumulated average value of data difference for each pixel between the adjacent frames is smaller than a reference value from the image data, and detect a data of the masked area as the first data.

For example, as shown in FIG. 4A, the image processor 200 can be sequentially supplied with the input image data of the plurality of frames (Fn, Fn+1, Fn+2, . . . , 'n' is a positive integer). The input image data of the plurality of frames (Fn, Fn+1, Fn+2, . . . ) can include a fixed area A1 (or first area) having almost no data change such as a still image, and a general area A2 (or second or normal area) in which the data is changed, such as a moving image.

The afterimage detecting part 202 accumulates and averages the data difference between the previous frame and the current frame in the plurality of pixels PXL by an input image data, to thereby obtain an average frame 310 of the data difference as shown in FIG. 4B. The average frame 310 of the data difference can include a first area 312 in which a data difference average value between frames is smaller than a reference value, and a second area 314 in which a data difference average value between frames is greater than a reference value. In the average frame 310 of the data difference, the first area 312 can correspond to the fixed area A1 for the plurality of frames (Fn, Fn+1, Fn+2, . . . ) shown in FIG. 4A, and the second area 314 can correspond to the general area (normal area) A2.

The afterimage detecting part 202 can generate the afterimage area mask 320 from the average frame 310 of the data difference as shown in FIG. 4C. The afterimage area mask 320 can include a mask area 322 corresponding to the first area 312 of the average frame 310 of the data difference and a general area (or normal area) 324 corresponding to the second area 314.

The afterimage detecting part 202 can detect and output the first data of the afterimage area corresponding to the mask area 322 of the afterimage area mask 320 from the input image data of the current frame Fn by using the afterimage area mask 320.

The saturation adjusting part 204 adjusts the saturation of the first data of the afterimage area detected by the afterimage detecting part 202 and converts the first data into second data (S210). The saturation adjustment method of the saturation adjusting part 204 will be described later. The saturation adjusting part 204 can output a third data of the general area (or normal area), which is not detected as the afterimage area, without conversion.

The image processor 200 can output the image data including the second data of the afterimage area and the third data of the normal area outputted from the saturation adjusting part 204 (S212).

The display panel 110 can display the image data output from the image processor 200. The display panel 110 can display the image data in which the afterimage is solved by the afterimage detecting part 202 and the saturation adjusting part 204 of the image processor 200.

Figure 5:
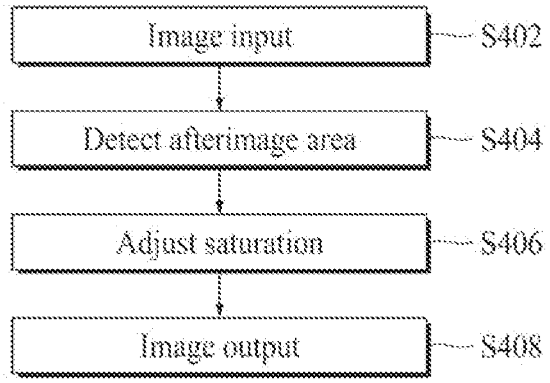
FIG. 5 illustrates an image processing method of a display apparatus according to another embodiment of the present disclosure.

FIG. 5 illustrates an image processing method of a display apparatus according to another embodiment of the present disclosure.

The image processing method shown in FIG. 5 is described in conjunction with the image processor 200 shown in FIG. 2.

Referring to FIGS. 2 and 5, the image processor 200 receives and inputs an image data (S402).

The afterimage detecting part 202 can detect the first data of the afterimage area from the input image data (S404). The afterimage detecting part 202 can detect the first data corresponding to the afterimage area in which the average value of accumulated data difference or accumulated data difference from the input image data is smaller than the reference value, by using a result of accumulating data differences for each pixel between adjacent frames. Since the afterimage detecting part 202 is substantially the same as the description of the afterimage detecting part 202 described with reference to FIGS. 3 to 4C, a description thereof can be omitted or simplified.

The saturation adjusting part 204 adjusts the saturation of the first data of the afterimage area detected by the afterimage detecting part 202 and converts the first data into the second data (S406). For example, the saturation adjusting part 204 can output the third data of the general area (or second area or normal area) which is not detected as the afterimage area without conversion.

The saturation adjusting part 204 according to some embodiments of the present disclosure can obtain a correction value of saturation for the first data of the afterimage area by a color space conversion. For example, the saturation adjusting part 204 can adjust the saturation of the first data (S=S×correction value) by applying the saturation correction value to the first data of the afterimage area. For example, the saturation adjusting part 204 can calculate a first saturation information value by using the color space conversion from the first data of the afterimage area. The saturation adjusting part 204 can adjust or reduce the saturation of the first saturation information value by applying the correction value of saturation to the first saturation information value.

The saturation adjusting part 204 converts RGB color space into an HSL color space, to thereby adjust the saturation. The color space can be a spatial concept in which a color display system is expressed in three dimensions. The RGB color space can designate a color based on a brightness of a red color, a green color, and a blue color corresponding to three primary colors. The HSL color space can be a color space in which hue, saturation, and lightness of the color are formed on each axis of the three-dimensional space. Herein, a black color is displayed when 'L' is 0, and a white color is displayed when 'L' is 1.

The saturation adjusting part 204 adjusts the first saturation information value to a second saturation information value according to the saturation correction value, and converts the second saturation information value into a second data by using a color space inverse conversion. The saturation correction value can be a predetermined correction value. The saturation correction value can be a plurality of correction values differently adjusted according to a plurality of ranges of the first saturation information value. For example, the correction value can be a gain value. For example, the gain value can be 0.1 or more to 0.3 or less. When the gain value is less than 1, it is possible to provide an image having a small degradation of image quality, whereby it is possible to reduce the saturation without deterioration of image quality.

The image processor 200 can output the image data including the second data of the afterimage area outputted from the saturation adjusting part 204 and the third data of the normal area (S408). The display panel 110 can display the image data output from the image processor 200.

According to some embodiments of the present disclosure, the image processor 200 can correct the image data without change in a cognitive picture quality before and after reduction of saturation for the afterimage area, whereby the display apparatus can provide the image capable of solving the afterimage.

The display apparatus according to some embodiments of the present disclosure can further include a storage part. The storage part can store the first saturation information value and the correction value corresponding to the first data in a lookup table form. The storage part can store the second data corresponding to the second saturation information value in a lookup table form. The storage part may store the correction value and the second saturation information value having a predetermined color difference value corresponding to the first saturation information value in a lookup table form. The image processor 200 can convert the first data of the afterimage area into the first saturation information value by the lookup table of the storage part and can convert the first data into the second saturation information value by applying the correction value of the lookup table. The image processor 200 can convert the second saturation information value into the second data by the lookup table. The first data and the second data can be stored in the lookup table of the storage part. Thus, the size of the storage part can be reduced compared to a case where the first saturation information value and the correction value are stored as the lookup table. The storage part, together with the image processor 200, can be configured in one or more of the image supply part 11, the timing controller 120, and the data driver 140 illustrated in FIG. 1.

The display apparatus according to some embodiments of the present disclosure can solve the afterimage by reducing the saturation according to the saturation correction value by using the color space conversion.

Figure 6:
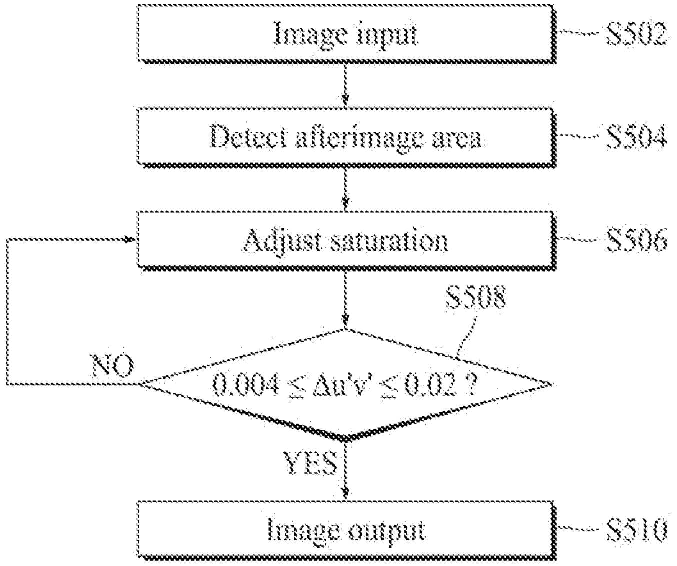
FIG. 6 illustrates an image processing method of a display apparatus according to another embodiment of the present disclosure.

FIG. 6 illustrates an image processing method of a display apparatus according to another embodiment of the present disclosure.

The image processing method shown in FIG. 6 is described in conjunction with the image processor 200 shown in FIG. 2.

Referring to FIGS. 2 and 6, the image processor 200 receives and inputs an image data (S502).

The afterimage detecting part 202 can detect the first data of the afterimage area from the input image data (S504). The afterimage detecting part 202 can detect the first data corresponding to the afterimage area in which the average value of accumulated data difference or accumulated data difference from the input image data is smaller than the reference value, by using a result of accumulating data differences for each pixel between adjacent frames. Since the afterimage detecting part 202 is substantially the same as the description of the afterimage detecting part 202 described with reference to FIGS. 3 to 4C, a description thereof can be omitted or simplified.

The saturation adjusting part 204 adjusts the saturation of the first data of the afterimage area detected by the afterimage detecting part 202 and converts the first data into the second data (S506). The saturation adjusting part 204 can output the third data of the general area (or second area or normal area) which is not detected as the afterimage area without conversion.

The saturation adjusting part 204 adjusts the saturation of the first data of the afterimage area to satisfy a predetermined reference color difference range $\Delta u'v'$ (S508), and converts the first data into the second data (S506). The predetermined reference color difference range $\Delta u'v'$ can be configured in a color difference range of a cognitive allowance level in which a viewer is difficult to recognize a color difference between the first data and the second data. For example, the reference color difference range $\Delta u'v'$ can be 0.004 or more and can be 0.02 or less.

The saturation adjusting part 204 according to some embodiments of the present disclosure can obtain a correction value of saturation for the first data of the afterimage area by a color space conversion and color difference $\Delta u'v'$. For example, the saturation adjusting part 204 can calculate a first saturation information value by performing the color space conversion of the first data of the afterimage area. The saturation adjusting part 204 calculates a saturation correction value $\Delta S$ satisfying the first saturation information value in the reference color difference range '$0.004 \leq \Delta u'v' \leq 0.02$', and adjusts or reduces the saturation of the first saturation information value by applying the calculated saturation correction value $\Delta S$. The saturation adjusting part 204 can convert a RGB color space into a HSL color space and can be the same as the content described in FIG. 5. The saturation correction value $\Delta S$ can be adjusted to satisfy the reference color difference range '$0.004 \leq \Delta u'v' \leq 0.02$'.

According to some embodiments of the present disclosure, the saturation adjusting portion 204 can calculate the first saturation information value from the first data of the afterimage area, adjust the first saturation information value to the second saturation information value according to the saturation correction value, and convert the second saturation information value into the second data. The saturation adjusting part 204 can calculate the color difference $\Delta u'v'$ between the first data and the second data. The saturation adjusting part 204 repeat the step of adjusting the second saturation information value by adjusting the saturation correction value until the calculated color difference $\Delta u'v'$ satisfies the reference color difference range '0.004≤Δu'v'≤0.02' (S506 and S508).

The display apparatus according to some embodiments of the present disclosure can further include a storage part. The storage part can store the first saturation information value and the correction value corresponding to the first data in a lookup table form. The storage part can store the second saturation information value satisfying the predetermined reference color difference range in response to the correction value and the first saturation information value in a lookup table form. The storage part can store the second data corresponding to the second saturation information value in a lookup table form. The image processor 200 can convert the first data of the afterimage area into the first saturation information value by using the lookup table of the storage part, and can convert the first data of the afterimage area into the second saturation information value satisfying the reference color difference range by applying the correction value of the lookup table. The image processor 200 can convert the second saturation information value into the second data by using the lookup table. The first data and the second data can be stored in the lookup table of the storage part. Accordingly, the size of the storage part can be reduced compared to a case where the first saturation information value and the correction value are stored as the lookup table. The storage part, together with the image processor 200, can be configured in one or more of the image supply part 11, the timing controller 120, and the data driver 140 illustrated in FIG. 1.

According to some embodiments of the present disclosure, the saturation adjusting part 204 can adjust the saturation so as to satisfy the reference color difference range so as to convert the first data of the afterimage area into the second data. The image processor 200 can output the image data including the second data of the afterimage area and the third data of the normal area outputted from the saturation adjusting part 204 (S510). The display panel 110 can display the image data output from the image processor 200.

According to some embodiments of the present disclosure, the image processor 200 can correct the image data without change in a cognitive picture quality before and after reduction of saturation for the afterimage area, for example, without the cognitive saturation change, whereby the display apparatus can provide the image capable of solving the afterimage. The display apparatus according to some embodiments of the present disclosure can solve the afterimage by reducing a degree of saturation in a cognitive permission level difficult for a viewer to recognize the data in the afterimage area by using the color space conversion and the reference color difference range.

Figure 7:
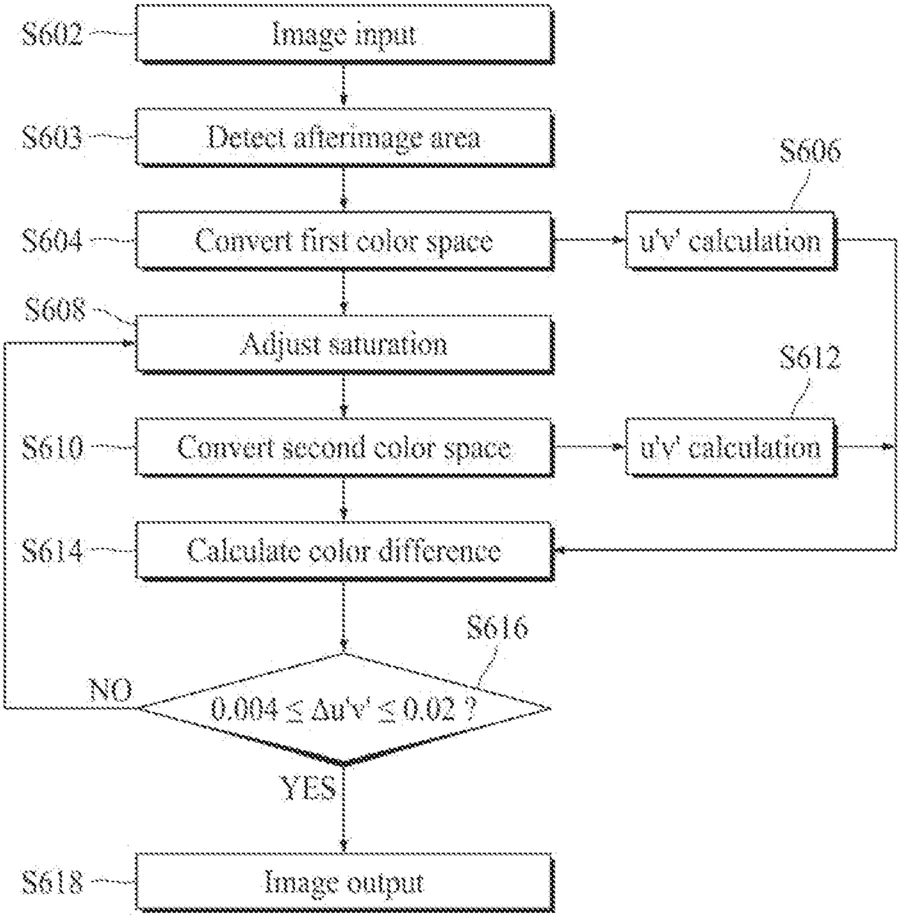
FIG. 7 illustrates an image processing method of a display apparatus according to another embodiment of the present disclosure.
Figure 8:
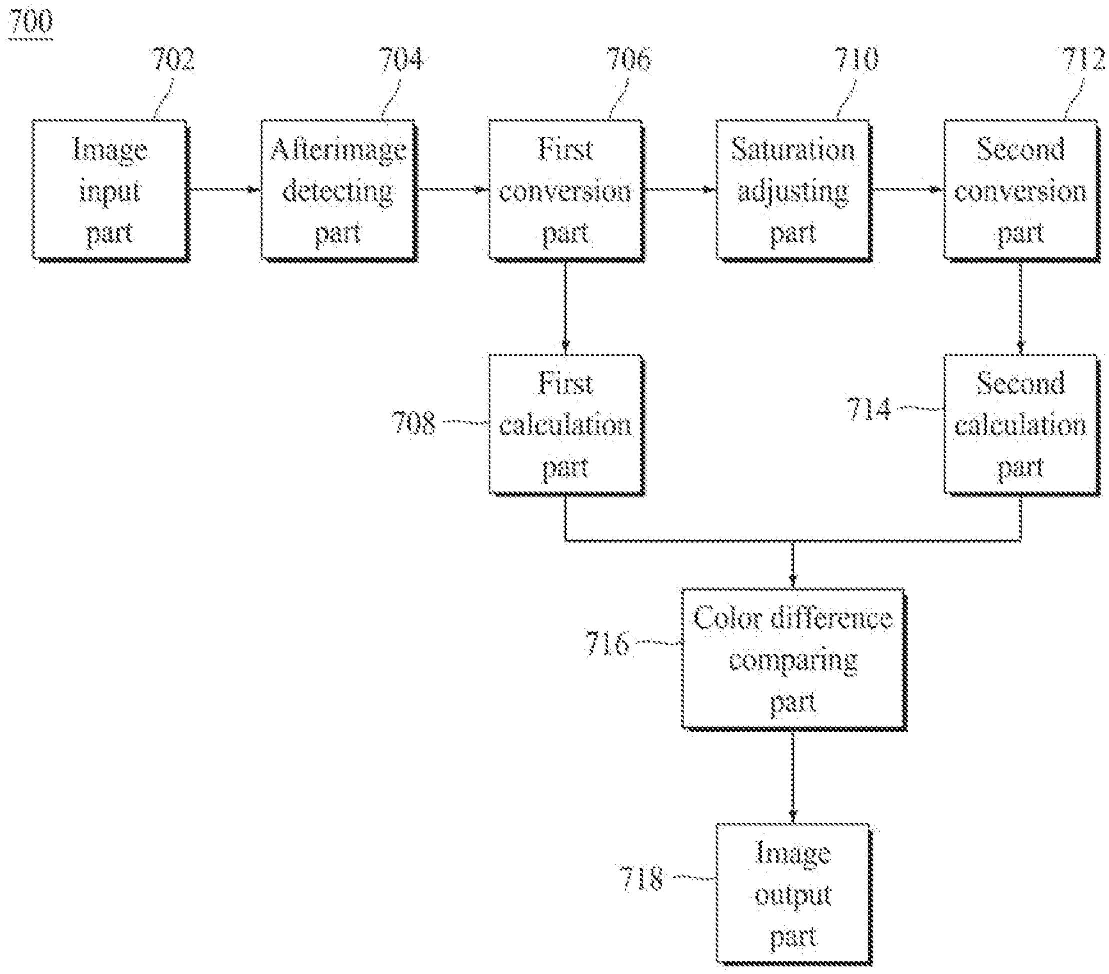
FIG. 8 is a block diagram illustrating a configuration of an image processor of a display apparatus according to another embodiment of the present disclosure.

FIG. 7 illustrates an image processing method of a display apparatus according to another embodiment of the present disclosure. FIG. 8 is a block diagram illustrating a configuration of an image processor of a display apparatus according to another embodiment of the present disclosure.

Referring to FIGS. 7 and 8, an image processor 700 of a display apparatus according to some embodiments of the present disclosure can include an afterimage detecting part 704, a saturation adjusting part 710, and a color difference comparing part 716. The image processor 700 can further include a first conversion part 706, a first calculation part 708, a second conversion portion 712, and a second calculation part 714. The image processor 700 can further include an image input part 702 and an image output part 718.

The image input part 702 of the image processor 700 receives and inputs an image data (S602).

The afterimage detecting part 704 can detect the first data of the afterimage area from the input image data (S603). The afterimage detecting part 704 can detect the first data corresponding to the afterimage area in which an average value of accumulated data difference or accumulated data difference from the input image data is smaller than a reference value, by using a result of accumulating data differences for each pixel between adjacent frames. The afterimage detecting part 704 is substantially the same as the afterimage detecting part 202 described with reference to FIGS. 3 to 4C.

The first conversion part 706 according to some embodiments of the present disclosure can convert the first data of the afterimage area into a first color space data by a first color space conversion (S604). The first conversion part 706 can convert the first data of the afterimage area from a RGB color space to a HSL color space. For example, the first data can be RGB data, and the first data can be converted into the HSL color space to calculate a first saturation information value.

In the RGB color space, a point where all RGB is a minimum value '0' is black, and a vector of a point of the maximum value of RGB is white. Then, red and green vectors become yellow, green and blue vectors become cyan, and, blue and red vectors become magenta. Further, neural colors, for example, gray can be positioned on a line for connecting the black and the white. The RGB color space is a concept of making all colors by a combination of three primary colors, but it can be insufficient in terms of a person who feels and expresses colors.

Accordingly, the HSL color space is configured based on an attribute in which a color is recognized (or perceive) in a person's eye and brain. Herein, 'H', color value of the hue of the HSL color space means a relative arrangement angle when the longest wavelength is 0° in a hue circle in which a visible light spectrum is arranged in a ring shape. Therefore, the 'H' value has a range of 0° to 360°, and 360° and 0° represent the same color. The saturation value S of the saturation indicates the extent in which the most significant or pure state of the particular color is taken to be 100%. The saturation value of 0% represents the achromatic color of the same lightness. The lightness can be a portion indicating a bright degree. The brightest color, for example, white color is set to 1.0 position (100%), the darkest color, for example, black color is placed at 0.0 position (0%), and the brightness of all other colors exists between white and black.

The first calculation part 708 according to some embodiments of the present disclosure can receive the first data of the afterimage area from the first conversion part 706 and can calculate a first uniform chromaticity diagram u'v' for the first data of the afterimage area (S606). The first uniform chromaticity diagram u'v' can represent the difference in colors. When the color space of RGB is sRGB', RGB can be converted into XYZ. This will be expressed by the following Equation 1.

$$\begin{bmatrix} X \\ Y \\ Z \end{bmatrix} = [M]\begin{bmatrix} r \\ g \\ b \end{bmatrix} \qquad \text{Equation 1}$$

$$M = \begin{bmatrix} 0.4124564 & 0.3575761 & 0.1804375 \\ 0.2126729 & 0.7151522 & 0.0721750 \\ 0.0193339 & 0.1191920 & 0.9503041 \end{bmatrix}$$

The equation for converting 'XYZ' into the uniform chromaticity diagram u'v' will be expressed by the following Equation 2.

$$u' = \frac{4X}{X + 15Y + 3Z} \qquad \text{Equation 2}$$

$$v' = \frac{9Y}{X + 15Y + 3Z}$$

The saturation adjusting part 710 according to some embodiments of the present disclosure can apply a saturation correction values to the first saturation information value of the afterimage area, and can adjust the first saturation information value to a second saturation information value (S=S−correction value (ΔS)) (S608). The saturation adjusting part 710 adjusts the first saturation information value of the first color space data to the second saturation information value based on the saturation correction value, whereby the first saturation information value can be corrected to the second color space data including the second saturation information value.

The second conversion part 712 according to some embodiments of the present disclosure can convert the second color space data including the second saturation information value of the afterimage area into the second data by a second color space conversion, for example, a color space inverse conversion (S610). The color space inverse conversion is to convert the HSL color space into the RGB color space.

The second calculation part 714 can calculate a second uniform chromaticity diagram u'v' from the second data. The second uniform chromaticity diagram u'v' can be calculated from the second data using Equations 1 and 2 described above.

The color difference comparing portion 716 according to some embodiments of the present disclosure can calculate a color difference value Δu'v' by comparing the first uniform chromaticity diagram and the second uniform chromaticity diagram (S614). The color difference value Δu'v' can be calculated using Equation 3 below.

$$\Delta u'v' = \sqrt{(u'_1 - u'_2)^2 + (v'_1 - v'_2)^2} \qquad \text{Equation 3}$$

In Equation 3, '$u'_1$' and '$v'_1$' can the first uniform chromaticity diagram, and '$u'_2$' and '$v'_2$' can be the second uniform chromaticity diagram.

The saturation adjusting part 710 can adjust the second saturation information value so that the color difference value Δu'v' between the first uniform chromaticity diagram and the second uniform chromaticity diagram satisfies the reference color difference range '0.004≤Δu'v'≤0.02' in the color difference comparing part 716. The saturation adjusting part 710 can adjust the second saturation information value by adjusting the saturation correction value Δ S such that the color difference value Δu'v' between the first uniform chromaticity diagram and the second uniform chromaticity diagram satisfies the reference color difference range '0.004≤Δu'v'≤0.02'. For example, the reference color difference range Δu'v' predetermined in the color difference comparing part 716 can be 0.004 or more and can be 0.02 or less. For example, the saturation adjusting part 710 can adjust or determine the saturation correction value based on the predetermined reference color difference range.

For example, if the color difference value Δu'v' between the first uniform chromaticity diagram and the second uniform chromaticity diagram does not satisfy the reference color difference range '0.004≤Δu'v'≤0.02' in the color difference comparing part 716 (S616, NO), the second saturation information value is outputted to the saturation adjusting part 710. Then, the step of adjusting the second saturation information value of the saturation adjusting part 710 (S608), the second color space conversion step (S610) of the second conversion part 712, the second uniform chromaticity diagram calculation step (S612) of the second calculation part 714, the color difference calculation step (S614) of the color difference comparing part 716, and the color difference comparing step (S616) can be repeatedly carried out.

According to another embodiment of the present disclosure, if the color difference value Δu'v' between the first uniform chromaticity diagram and the second uniform chromaticity diagram does not satisfy the reference color difference range '0.004≤Δu'v'≤0.02' in the color difference comparing part 716 (S616, NO), it is returned to the first conversion part 706 and the first color space conversion step (S604) can be carried out. Then, the step of adjusting the second saturation information value of the saturation adjusting part 710 (S608), the second color space conversion step (S610) of the second conversion part 712, the second uniform chromaticity diagram calculation step (S612) of the second calculation part 714, the color difference calculation step (S614) of the color difference comparing part 716, and the color difference comparing step (S616) can be repeatedly carried out.

If the color difference value Δu'v' between the first uniform chromaticity diagram and the second uniform chromaticity diagram satisfies the reference color difference range '0.004≤Δu'v'≤0.02' in the color difference comparing part 716 (S616, YES), the color difference comparing part 716 can output the second data of the afterimage area.

The image output part 718 can output the image data including the second data of the afterimage area and the third data of the normal area outputted from the color difference comparing part 716 (S618). The display panel 110 can display the image data output from the image processor 200.

The display apparatus according to some embodiments of the present disclosure can further include a storage part. The storage part can store the first saturation information value and the saturation correction value corresponding to the first data in a lookup table form. The storage part can store the first saturation information value, the second saturation information value, and the first uniform chromaticity diagram and the second uniform chromaticity diagram in a lookup table form. The storage part can store the second data corresponding to the second saturation information value in a lookup table form. The first data and the second data can be stored in the lookup table of the storage part. Accordingly, the size of the storage part can be reduced compared to a case where the saturation information value and the correction value are stored as a lookup table. The storage part, together with the image processor 700, can be configured in one or more of the image supply part 11, the timing controller 120, and the data driver 140 illustrated in FIG. 1.

According to some embodiments of the present disclosure, the image processor 700 can correct the image data without change in a cognitive picture quality before and after reduction of saturation for the afterimage area, for example, without the cognitive saturation change, whereby the display apparatus can provide the image capable of solving the afterimage. The display apparatus according to some embodiments of the present disclosure can solve the afterimage by reducing a degree of saturation in a cognitive permission level difficult for a viewer to recognize data in the afterimage area by using the color space conversion and the reference color difference range.

Table 1 below shows an improvement rate at a time of the afterimage occurrence compared to the original image according to the saturation reduction of the embodiment of the present disclosure described in FIG. 5. An improvement rate of the embodiment of the present disclosure to original is measured by comparing times of the afterimage occurrence in the first to third test images and a time of the afterimage occurrence of the original image.

TABLE 1

| | Improvement rate to original image (%) | | | |
|---|---|---|---|---|
| | R | G | B | W |
| First test image | 311 | 0 | 0 | 3 |
| Second test image | 557 | 618 | 129 | 6 |
| Third test image | 254 | 508 | 109 | 1 |
| Average | 374 | 375 | 79 | 1 |

Referring to improvement rates at the times of the afterimage occurrence in the Table 1, the red color was measured to have an improvement rate of 374%, a green color has an improvement rate of 375%, a blue color has an improvement rate of 79%, and a white color has an improvement rate of 1%, compared to the original image.

The following Table 2 shows an improvement rate at a time of the afterimage occurrence to the original image according to the saturation reduction of the embodiment of the present disclosure described in FIG. 6. An improvement rate of the embodiment of the present disclosure to original image is measured by comparing times of the afterimage occurrence in the first to third test images and a time of the afterimage occurrence of the original image.

TABLE 2

| | Improvement rate to original image (%) | | | |
|---|---|---|---|---|
| | R | G | B | W |
| First test image | 52 | 1 | 0 | 0 |
| Second test image | 73 | 73 | 19 | 0 |
| Third test image | 74 | 109 | 34 | 4 |
| Average | 66 | 61 | 18 | 1 |

Referring to improvement rates at the times of the afterimage occurrence in the Table 2, the red color was measured to have an afterimage improvement rate of 66%, a green color has an improvement rate of 61%, a blue color has an improvement rate of 18%, and a white color has an improvement rate of 1%, compared to the original.

Referring to Table 1 and Table 2, as compared to the embodiment of FIG. 6 to which the cognitive saturation adjustment method is applied, the embodiment of FIG. 5 to which the simple saturation adjustment method using the reference color difference range is applied can further improved the improvement rate at the time of the afterimage occurrence. The simple saturation adjustment method has a great improvement effect addressing afterimage, but there is a limit to cognitively feeling the difference in saturation reduction. The cognitive saturation adjustment method has a smaller improvement effect addressing afterimage than the simple saturation adjustment method but has the advantage that a user cannot perceive the difference cognitively.

In the following Table 3, the data before the saturation reduction is compared to the data after the saturation reduction according to some embodiments of the present disclosure described in FIG. 6. For example, in the following Table 3, the input data can be first RGB data, and the saturation reduced data can be second RGB data.

TABLE 3

| | Input data | | | Saturation reduced data | | |
|---|---|---|---|---|---|---|
| | R | G | B | R | G | B |
| Blue | 46 | 60 | 153 | 50 | 63 | 149 |
| Green | 71 | 150 | 69 | 81 | 139 | 80 |
| Red | 177 | 44 | 56 | 171 | 50 | 61 |
| Yellow | 238 | 200 | 27 | 191 | 170 | 74 |
| Magenta | 187 | 82 | 148 | 179 | 90 | 146 |
| Cyan | 0 | 135 | 166 | 41 | 110 | 125 |

Referring to the above Table 3, it shows the data for pixels displaying blue, green, red, yellow, magenta, and cyan. In the pixel displaying the blue color, values of R, G, and B of the input data are 46, 60, and 153, and values of R, G, and B of the data after the saturation reduction are measured as 50, 63, and 149, respectively. Accordingly, it can be known that the change in blue color before and after the saturation reduction is small. In the pixel displaying the green color, values of R, G, and B of the input data are 71, 150, and 69, and values of R, G, and B of the data after the saturation reduction are measured 81, 139, and 80, respectively. Accordingly, it can be known that the change in green color before and after the saturation reduction is small. In the pixel displaying the red color, values of R, G, and B of the input data are 177, 44, and 56, and values of R, G, and B of the data after the saturation reduction are measured as 171, 50, and 61, respectively. Therefore, it can be known that the change in the red color before and after the saturation reduction is small. In the pixel displaying the yellow color, values of R, G, and B of the input data are 238, 200, and 27, and values of R, G, and B of the data after the saturation reduction are measured 191, 170, and 74, respectively. In the pixel displaying the magenta color, values of R, G, and B of the input data are 187, 82, and 148, and values of R, G, and B of the data after the saturation reduction are measured as 179, 90, and 146, respectively. Therefore, it can be known that the change in magenta color before and after the saturation reduction is small. In the pixels displaying the cyan color, values of R, G, and B of the input data are 0, 135, and 166, and values of R, G, and B of the data after the saturation reduction are measured as 41, 110, and 125, respectively.

According to some embodiments of the present disclosure, in case of the display apparatus to which the saturation reduction is applied by using the color space conversion, the color difference value before and after the saturation reduction satisfies the reference color difference value 0.02 or the reference color difference range '$0.004 \leq \Delta u'v' \leq 0.02$' so that it is possible to realize the display apparatus capable of solving the afterimage without the change in saturation before and after the saturation reduction, and to improve the lifespan of the display apparatus.

The image processor 200 and 700 according to an embodiment of the present disclosure described in FIGS. 2 to 8 can be configured in the image supply part 11. For example, the image supply part 11 can include the image processor 200 and 700, and can supply the image data including the second data obtained by correcting the first data of the afterimage area, and the third data of the other or another area (or general area or normal area) different from the afterimage area.

The image processor 200 and 700 according to another embodiment of the present disclosure can be configured in the timing controller 120. For example, the timing controller 120 can include the image processor 200 and 700, and can supply the image data including the second data obtained by correcting the first data of the afterimage area, and the third data of the other or another area (or general area or normal area) different from the afterimage area.

The image processor 200 and 700 according to another embodiment of the present disclosure can be configured in the data driver 140. For example, the data driver 140 can include the image processor 200 and 700, and can convert the image data including the second data obtained by correcting the first data of the afterimage area, and the third data of the other or another area (or general area or normal area) different from the afterimage area into the data voltage and output the data voltage to the data line of the display panel 110.

The display apparatus according to some embodiments of the present disclosure can comprise the display panel 110, a controller, and a circuit part.

The display panel 110 can include the plurality of pixels. The controller can be the timing controller 120, and embodiments of the present disclosure are not limited thereto.

The controller according to some embodiments of the present disclosure receives the image data, detects the first data of the afterimage area from the image data by accumulating the data difference for each pixel between adjacent frames by using the image data, determines the saturation correction value based on the first data of the afterimage area, corrects the first data of the afterimage area to the second data on the basis of the saturation correction value, and supplies the output data including the second data. The circuit part can provide the data signal to the plurality of pixels based on the output data supplied from the controller.

FIGS. 9A to 9F illustrate the saturation change before and after the saturation reduction according to an embodiment of the present disclosure.

Particularly, FIGS. 9A to 9F illustrate the saturation change according to the color difference values described in FIGS. 7 and 8. In FIGS. 9A to 9F, the first pixel 811, 821, 831, 841, 851, and 861 positioned at a left portion shows the values obtained by measuring the first RGB data before the saturation reduction, and the second pixel 812, 822, 832, 842, 852, and 862 positioned at a right portion shows the values obtained by measuring the second RGB data after the saturation reduction.

Figure 9A:
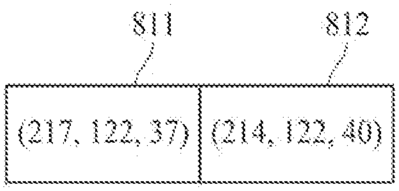
FIGS. 9A to 9F illustrate a saturation reduction method according to an embodiment of the present disclosure.
Figure 9B:
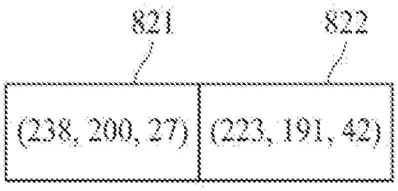
Figure 9C:
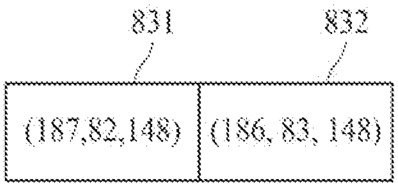

FIGS. 9A, 9B, and 9C illustrate the change in saturation when the color difference value Δu'v' before and after the saturation reduction is '0.004'. Referring to FIG. 9A, values of R, G, and B of the first pixel 811 displaying an orange color before the saturation reduction are 217, 122, and 37, and values of R, G, and B of the second pixel 812 after the saturation reduction are 214, 122, and 40. Referring to FIG. 9B, values of R, G, and B of the first pixel 821 displaying a yellow color before the saturation reduction are 238, 200, and 27, and values of R, G, and B of the second pixel 822 after the saturation reduction are 223, 191, and 42, respectively. Referring to FIG. 9C, values of R, G, and B of the first pixel 831 displaying a violet color before the saturation reduction are 187, 82, and 148, and values of R, G, and B of the second pixel 832 after the saturation reduction are 186, 83, and 148, respectively. Therefore, on assumption that the color difference value Δu'v' before and after the saturation reduction according to some embodiments of the present disclosure is '0.004', a viewer does not feel the color difference between the original image and the image after the saturation reduction positioned adjacent to each other, whereby there is little change in color before and after the saturation reduction.

Figure 9D:
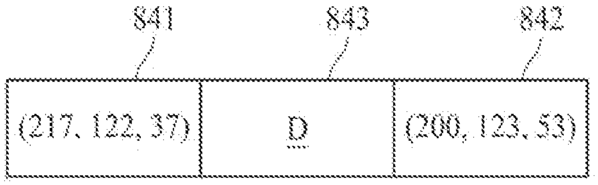
Figure 9E:
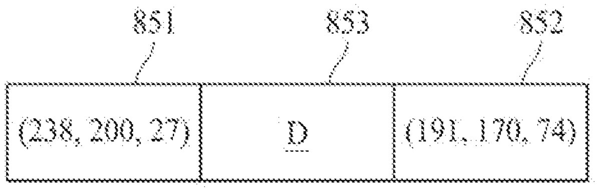
Figure 9F:
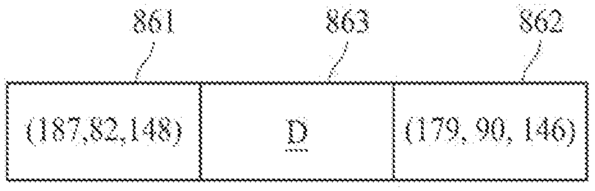

FIGS. 9D, 9E, and 9F illustrate the change in saturation when the color difference value Δu'v' before and after the saturation reduction is '0.02'. FIGS. 9D, 9E, and 9F illustrate the change in saturation when the first pixel 841, 851, and 861 before the saturation reduction and the second pixel 842, 852, and 862 after the saturation reduction are separated by the pixel 843, 853, and 863 of interval 'D'. Referring to FIG. 9D, values of R, G, and B of the first pixel 841 displaying an orange color before the saturation reduction are 217, 122, and 37, and values of R, G, and B of the second pixel 842 after the saturation reduction are 200, 123, and 53. Referring to FIG. 9E, values of R, G, and B of the first pixel 851 displaying a yellow color before the saturation reduction are 238, 200, and 27, and values of R, G, and B of the second pixel 852 after the saturation reduction are 191, 170, and 74, respectively. Referring to FIG. 9F, values of R, G, and B of the first pixel 861 displaying a violet color before the saturation reduction are 187, 82, and 148, and values of R, G, and B of the second pixel 862 after the saturation reduction are 179, 90, and 146, respectively. Therefore, on assumption that the color difference value Δu'v' before and after the saturation reduction according to some embodiments of the present disclosure is '0.02', the difference in color can be recognized as an allowable level when being separated, and there is little change in color before and after the saturation reduction. In addition, when the color difference value Δu'v' before and after the saturation reduction exceeds '0.02', an image quality can be deteriorated. Thus, the display apparatus according to some embodiments of the present disclosure is configured to have the color difference value less than or equal to 0.02 so that it is possible to solve the afterimage without deterioration of picture quality.

FIGS. 10A to 10F illustrate the change in saturation before and after the saturation reduction according to an embodiment of the present disclosure.

Particularly, FIGS. 10A to 10F illustrate the change in saturation according to the saturation reduction method described with reference to FIGS. 5, 7, and 8. In FIGS. 10A to 10F, the first pixel 911, 921, 931, 941, 951, and 961 positioned at a left portion shows the values obtained by measuring the first RGB data before the saturation reduction, and the second pixel 912, 922, 932, 942, 952, and 962 positioned at a right portion shows the values obtained by measuring the second RGB data after the saturation reduction.

Figure 10A:
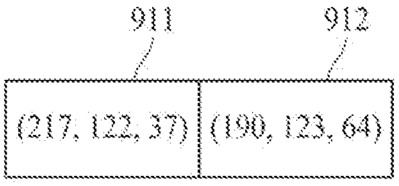
FIGS. 10A to 10F illustrate a saturation reduction method according to another embodiment of the present disclosure.
Figure 10B:
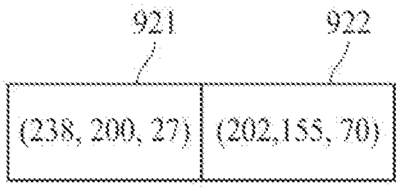
Figure 10C:
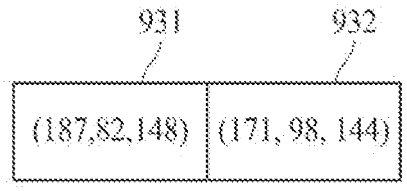

FIGS. 10A, 10B, and 10C illustrate the change in saturation according to the saturation reduction method described with reference to FIG. 5. For example, it shows the change in saturation when the saturation correction value described in FIG. 5 is applied to '0.3'. Referring to FIG. 10A, values of R, G, and B of the first pixel 911 displaying an orange color before the saturation reduction are 217, 122, and 37, and values of R, G, and B of the second pixel 912 after the saturation reduction are 190, 123, and 64. Referring to FIG. 10B, values of R, G, and B of the first pixel 921 displaying a yellow color before the saturation reduction are 238, 200, and 27, and values of R, G, and B of the second pixel 922 after the saturation reduction are 202, 155, and 70, respectively. Referring to FIG. 10C, values of R, G, and B of the first pixel 931 displaying a violet color before the saturation reduction are 187, 82, and 148, and values of R, G, and B of the second pixel 932 after the saturation reduction are 171, 98, and 144, respectively.

Figure 10D:
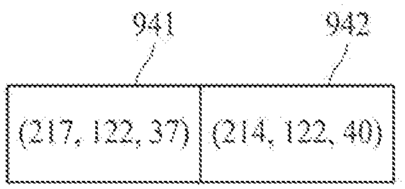
Figure 10E:
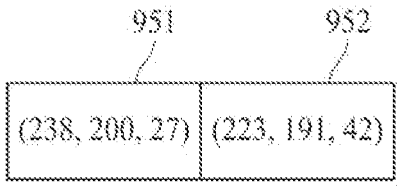
Figure 10F:
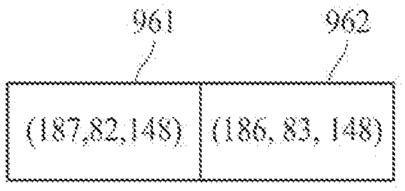

FIGS. 10D, 10E, and 10F illustrate the change in saturation according to the saturation reduction method described with reference to FIGS. 7 and 8. For example, FIGS. 7 and 8 illustrate the change in saturation when the color difference value Δu'v' before and after the saturation reduction is '0.004'. Referring to FIG. 10D, values of R, G, and B of the first pixel 941 displaying an orange color before the saturation reduction are 217, 122, and 37, and values of R, G, and B of the second pixel 942 after the saturation reduction are 214, 122, and 40. Referring to FIG. 10E, values of R, G, and B of the first pixel 951 displaying a yellow color before the saturation reduction are 238, 200, and 27, and values of R, G, and B of the second pixel 952 after the saturation reduction are 223, 191, and 42, respectively. Referring to FIG. 10F, values of R, G, and B of the first pixel 961 displaying a violet color before the saturation reduction are 187, 82, and 148, and values of R, G, and B of the second pixel 962 after the saturation reduction are 186, 83, and 148, respectively.

Referring to FIGS. 10A to 10F, it can be known that the saturation reduction method described in FIGS. 7 and 8 has the relatively small change in color before and after the saturation reduction, compared to the saturation reduction method described in FIG. 5. According to some embodiments of the present disclosure, since the saturation is reduced by using the color space conversion and the reference color difference range, it can be known that the change in color before and after the saturation reduction is small.

Figure 11:
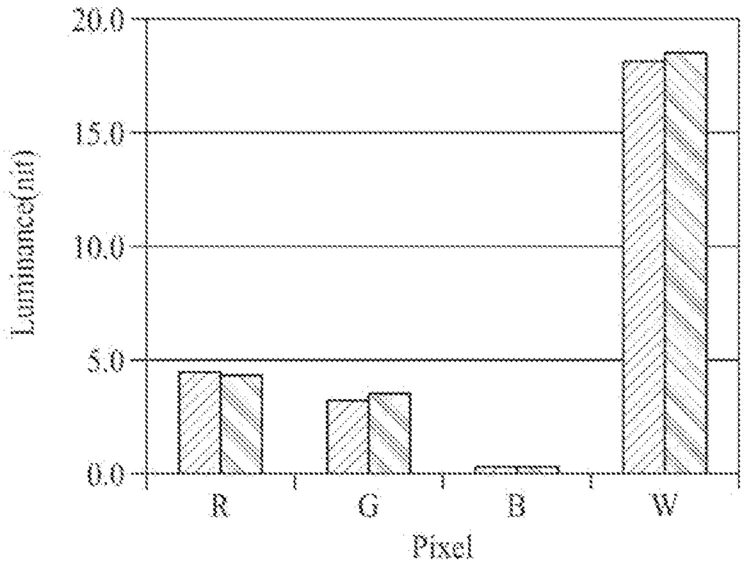
FIG. 11 illustrates an example of the luminance of subpixels according to an embodiment of the present disclosure.

FIG. 11 illustrates luminance of subpixels according to an embodiment of the present disclosure.

In FIG. 11, a horizontal axis represents a pixel, and a vertical axis represents a luminance (unit: nit). A thin solid line represents a luminance of an original image, and a thick solid line represents an average luminance after the saturation reduction. The saturation reduction is applied to the saturation reduction method described with reference to FIGS. 7 and 8.

Referring to FIG. 11, the luminance of the original image in the red subpixel is 4.9 nit, and the luminance after the saturation reduction is 4.8 nit. It can be known that the luminance difference before and after the saturation reduction of the red subpixel is −0.1 nit. The luminance of the original image in the green subpixel is 4.4 nit, and the luminance after the saturation reduction is measured as 4.6 nit. It can be known that the luminance difference before and after the saturation reduction of the green subpixel is +0.2 nit. In the blue subpixel, the luminance of the original image is 0.1 nit, and the luminance after the saturation reduction is 0.1 nit. It can be known that the luminance difference before and after the saturation reduction of the blue subpixel is 0. In the white subpixel, the luminance of the original image is 15.4 nit, and the luminance after the saturation reduction is 15.8 nit. It can be known that the luminance difference before and after the saturation reduction of the white subpixel is +0.4 nit. Therefore, according to some embodiments of the present disclosure, there is almost no change in the overall luminance even if the saturation reduction is applied. According to some embodiments of the present disclosure, the afterimage can be solved without the change in luminance even if the saturation reduction is applied. For example, when the luminance is adjusted to solve the afterimage, the saturation can be deteriorated, and deterioration of image quality due to the luminance degradation can occur when the saturation is adjusted to solve the afterimage. According to some embodiments of the present disclosure, the afterimage can be solve without the change in luminance even though the saturation is reduced to solve the afterimage, thereby solving the afterimage without deterioration of the image quality and improving the lifespan of display apparatus.

Figure 12:
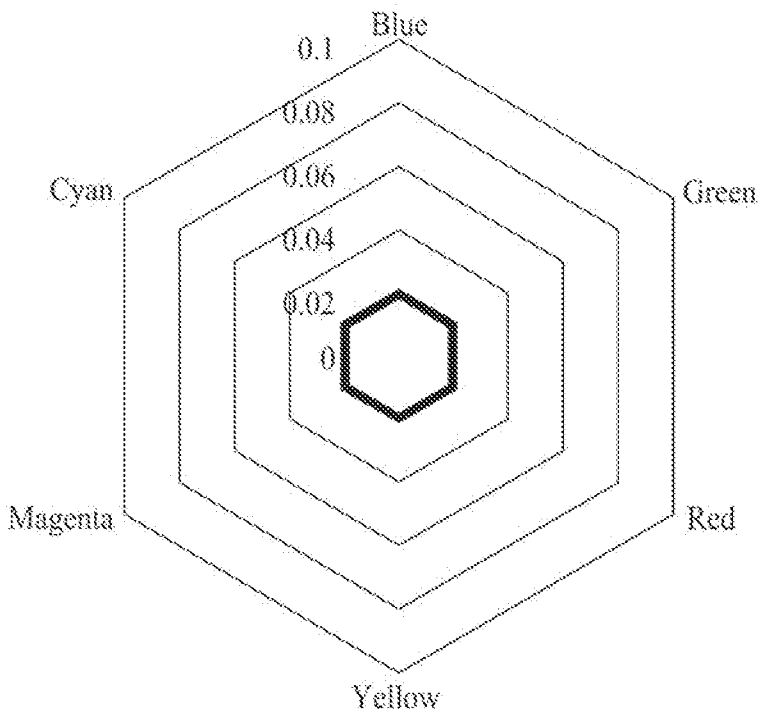
FIG. 12 illustrates a color difference between data before and after the saturation reduction according to an embodiment of the present disclosure.

FIG. 12 illustrates a color difference between the data before and after the saturation reduction according to an embodiment of the present disclosure. Particularly, FIG. 12 illustrates a color difference of the following Table 4.

The following Table 4 compares the data before and after the saturation reduction of FIGS. 6 and 7 according to some embodiments of the present disclosure. The second uniform chromaticity diagram and the color difference are shown.

TABLE 4

| | Input data | | Saturation reduced data | | Color difference |
|---|---|---|---|---|---|
| | u' | v' | u' | v' | Δu'v' |
| Blue | 0.19 | 0.21 | 0.19 | 0.23 | 0.02 |
| Green | 0.14 | 0.54 | 0.15 | 0.53 | 0.02 |
| Red | 0.42 | 0.50 | 0.40 | 0.50 | 0.02 |
| Yellow | 0.23 | 0.56 | 0.22 | 0.54 | 0.02 |
| Magenta | 0.31 | 0.39 | 0.29 | 0.40 | 0.02 |
| Cyan | 0.15 | 0.38 | 0.16 | 0.41 | 0.02 |

Referring to the above Table 4, data for pixels displaying blue, green, red, yellow, magenta, and cyan colors is provided. In the pixel displaying the blue color, u'v' values of the uniform chromaticity diagram of the input data are 0.19 and 0.21, and u'v' values of the uniform chromaticity diagram after the saturation reduction are measured as 0.19 and 0.23. In the pixel displaying the blue color, the color difference value Δu'v', which is the difference between the uniform chromaticity diagram value of the input data and the uniform chromaticity diagram value after the saturation reduction, is measured as 0.02. Therefore, it can be known that there is only small change of the u'v' value of the uniform chromaticity diagram before and after the saturation reduction, and the color difference value Δu'v' is 0.02. In the pixel displaying the green color, u'v' values of the uniform chromaticity diagram of the input data are 0.14 and 0.54, and u'v' values of the uniform chromaticity diagram after the saturation reduction are 0.15 and 0.53. In the pixel displaying the green color, the color difference value Δu'v' is measured as 0.02. Therefore, it can be known that there is only small change of the u'v' value of the uniform chromaticity diagram before and after the saturation reduction in the pixel displaying the green color, and the color difference value Δu'v' is 0.02.

In the pixel displaying the red color, u'v' values of the uniform chromaticity diagram of the input data are 0.42 and 0.50, u'v' values of the uniform chromaticity diagram after the saturation reduction are 0.40 and 0.50, and the color difference value Δu'v' is 0.02. Thus, it can be known that there is only small change of the u'v' value of the uniform chromaticity diagram before and after the saturation reduction in the pixel displaying the red color, and the color difference value Δu'v' is 0.02. In the pixel displaying the yellow color, u'v' values of the uniform chromaticity diagram of the input data are 0.23 and 0.56, u'v' values of the uniform chromaticity diagram after the saturation reduction are 0.22 and 0.54, and the color difference value Δu'v' is 0.02. Thus, it can be known that there is only small change of the u'v' value of the uniform chromaticity diagram before and after the saturation reduction in the pixel displaying the yellow color, and the color difference value Δu'v' is 0.02.

In the pixel displaying the magenta color, u'v' values of the uniform chromaticity diagram of the input data are 0.31 and 0.39, u'v' values of the uniform chromaticity diagram after the saturation reduction are 0.29 and 0.40, and the color difference value Δu'v' is measured as 0.02. Thus, it can be known that there is only small change of the u'v' value of the uniform romaticity diagram before and after the saturation reduction in the pixel displaying the magenta color, and the color difference value Δu'v' is 0.02. In the pixel displaying the cyan color, u'v' values of the uniform chromaticity diagram of the input data are 0.15 and 0.38, u'v' values of the uniform chromaticity diagram after the saturation reduction are 0.16 and 0.41, and the color difference value Δu'v' is 0.02. Thus, it can be known that there is only small change of the u'v' value of the uniform chromaticity diagram before and after the saturation reduction in the pixel displaying the cyan color, and the color difference value Δu'v' is 0.02.

According to some embodiments of the present disclosure, in case of the display apparatus to which the saturation reduction is applied by using the color space conversion, the color difference value Δu'v' before and after the saturation reduction satisfies the range of 0.02 or not greater than 0.02 so that it is possible to realize the display apparatus capable of solving the afterimage without the saturation change before and after the saturation reduction. In addition, it is possible to provide the display apparatus in which image quality deterioration is minimized by solving of afterimage, thereby improving the lifespan of the display apparatus.

A display apparatus according to some embodiments of the present disclosure can solve or address the afterimage limitation without deteriorating image quality. A display apparatus according to some embodiments of the present disclosure can improve the lifespan by solving or addressing the afterimage limitation without deteriorating image quality. A display apparatus according to some embodiments of the present disclosure can solve the afterimage by adjusting the saturation without changing luminance.

A display apparatus according to some embodiments of the present disclosure can be applied to a mobile device, a video phone, a smart watch, a watch phone, a wearable apparatus, a foldable apparatus, a rollable device, a bendable apparatus, a flexible apparatus, a curved apparatus, a sliding apparatus, a variable apparatus, an electronic notebook, an electronic book, a portable multimedia player PMP, a personal digital assistant PDA, an MP3 player, a mobile medical device, a desktop PC, a laptop PC, a netbook computer, a workstation, a navigation device, a vehicle navigation device, a vehicle display device, a vehicle device, a theater device, a theater display device, a television, a wallpaper device, a signage device, a game device, a notebook, a monitor, a camera, a camcorder, and a home appliance. In addition, the display apparatus of the present disclosure can be applied to an organic emission lighting device or an inorganic emission lighting device.

A display apparatus according to some embodiments of the present disclosure can be described as follows.

A display apparatus according to some embodiments of the present disclosure can include an afterimage detecting part configured to detect a first data of an afterimage area from an image data, a saturation adjusting part configured to adjust a saturation of the first data of the afterimage area detected by the afterimage detecting part, and convert the first data into a second data, and a display panel including a plurality of pixels configured to display data including the second data output from the saturation adjusting part.

According to some embodiments of the present disclosure, the afterimage detecting part can detect the first data of the afterimage area by accumulating a data difference between adjacent frames of each of the plurality of pixels.

According to some embodiments of the present disclosure, the saturation adjusting part can be configured to calculate a first saturation information value from the first data of the afterimage area, adjust the first saturation information value to a second saturation information value according to a correction value, and convert the data including the second saturation information value into the second data.

According to some embodiments of the present disclosure, the display apparatus can further include a storage part configured to store the correction value and the first saturation information value corresponding to the first data in a lookup table form.

According to some embodiments of the present disclosure, the display apparatus further can include a storage part configured to store the first data and the second data in a lookup table form.

According to some embodiments of the present disclosure, the saturation adjusting part can be configured to calculate the first saturation information value from the first data of the afterimage area, adjust the first saturation information value to the second saturation information value according to the correction value, convert the data including the second saturation information value into the second data, and calculate a color difference value between the first data and the second data.

According to some embodiments of the present disclosure, the display apparatus can further include a storage part configured to store the correction value and the second saturation information value having a predetermined color difference value corresponding to the first saturation information value in a lookup table form.

According to some embodiments of the present disclosure, the display apparatus can further include a storage part configured to store the first data and the second data in a lookup table form.

According to some embodiments of the present disclosure, the saturation adjusting part can be configured to convert the first data into the second data included in the predetermined reference color difference range and output the second data.

According to some embodiments of the present disclosure, the predetermined reference color difference range can be about 0.004 or more and about 0.02 or less, or from about 0.004 to about 0.02.

According to some embodiments of the present disclosure, the saturation adjusting part can be configured to calculate a first uniform chromaticity diagram and the first saturation information value by converting the first data of the afterimage area in a color space conversion, adjust the first saturation information value to the second saturation information value according to the correction value, calculate a second uniform chromaticity diagram and the second data by converting the second saturation information value in a color space inverse conversion, and calculate a color difference value by comparing the first uniform chromaticity diagram with the second uniform chromaticity diagram.

According to some embodiments of the present disclosure, the display apparatus can further include a storage part configured to store the first uniform chromaticity diagram and the second uniform chromaticity diagram in a lookup table form.

According to some embodiments of the present disclosure, the saturation adjusting part can be configured to adjust the second saturation information value so that the calculated color difference value satisfies the predetermined reference color difference range.

According to some embodiments of the present disclosure, the saturation adjusting part can be configured to convert the first data into the second data based on the predetermined reference color difference range.

According to some embodiments of the present disclosure, the predetermined reference color difference range can be from about 0.004 to about 0.02.

According to some embodiments of the present disclosure, the display apparatus can further include an image supply part including the image detecting part and the saturation adjusting part, and be configured to supply the second data of the afterimage area and third data of the other area (or another area) different from the afterimage area, a timing controller configured to output the data received from the image supply part, a data driver configured to convert the data supplied from the timing controller into data voltages and apply the data voltages to data lines of the display panel, and a gate driver configured to drive gate lines of the display panel according to a control of the timing controller.

According to some embodiments of the present disclosure, the display apparatus can further include an image supply part configured to supply the image data, a timing controller including the afterimage detecting part and the saturation adjusting part and configured to supply the second data of the afterimage area and third data of the other area (or another area) different from the afterimage area, a data driver configured to convert the data supplied from the timing controller into data voltages, and apply the data voltage to data lines of the display panel, and a gate driver configured to drive gate lines of the display panel according to a control of the timing controller.

According to some embodiments of the present disclosure, the display apparatus can further include an image supply part configured to supply the image data, a timing controller configured to output the image data received from the image supply part, a data driver including the afterimage detecting part and the saturation adjusting part and configured to convert the second data of the afterimage area and third data of the other area (or another area) different from the afterimage area into data voltages, and to output the data voltages to data lines of the display panel, and a gate driver configured to drive gate lines of the display panel according to a control of the timing controller.

According to some embodiments of the present disclosure, the correction value can be a gain value which is 0.1 or more to 0.3 or less, or from about 0.1 to about 0.3.

According to some embodiments of the present disclosure, the afterimage detecting part can accumulate and average the data difference between a previous frame and a current frame in the plurality of pixels by the image data, to thereby obtain an average frame of the data difference, so as to detect the first data of the afterimage area.

According to some embodiments of the present disclosure, the afterimage detecting part can generate an afterimage area mask from the average frame of the data difference, and detects and output the first data of the afterimage area from the image data of the current frame by using the afterimage area mask.

A display apparatus according to some embodiments of the present disclosure can include a display panel including a plurality of pixels, a controller configured to receive an image data, detect a first data of an afterimage area from the image data by accumulating a data difference for each pixel between adjacent frames by the image data, adjust a saturation correction value based on the first data of the afterimage area, correct the first data of the afterimage area to second data based on the saturation correction value, and supply an output data including the second data, and a circuit part configured to provide data signals to the plurality of pixels based on the output data supplied from the controller.

According to some embodiments of the present disclosure, the controller can include an afterimage detecting part configured to detect the first data of the afterimage area from the image data, and a saturation adjusting part configured to determine the saturation correction value for the first data of the afterimage area and to correct the first data to the second data.

According to some embodiments of the present disclosure, the afterimage detecting part can mask an area in which an accumulated average value of data difference for each pixel between the adjacent frames is smaller than a reference value from the image data, and detect a data of the masked area as the first data.

According to some embodiments of the present disclosure, the saturation correction value can be a predetermined gain value.

According to some embodiments of the present disclosure, the saturation adjusting part can be configured to correct the first data into the second data based on a predetermined reference color difference range.

According to some embodiments of the present disclosure, the predetermined reference color difference range can be 0.004 or more and 0.02 or less, or from about 0.004 to about 0.02.

According to some embodiments of the present disclosure, the controller can include an afterimage detecting part configured to detect the first data of the afterimage area from the image data, a first conversion part configured to convert the first data into first color space data by converting the first data in a color space conversion, a first calculation part configured to calculate a first uniform chromaticity diagram from the first data of the first conversion part, a saturation adjusting part configured to adjust the saturation of the first color space data based on the saturation correction value and to correct the first color space data to second color space data, a second conversion part configured to convert the second color space data to the second data by a color space inverse conversion, a second calculation part configured to calculate a second uniform chromaticity diagram from the second data, and a color difference comparing part configured to calculate a color difference value between the first uniform chromaticity diagram of the first calculation part and a second uniform chromaticity diagram of the second calculation part, and to compare the calculated color difference value with a predetermined reference color difference range.

According to some embodiments of the present disclosure, the saturation adjusting part can adjust the saturation correction value based on the predetermined reference color difference range.

According to some embodiments of the present disclosure, the predetermined reference color difference range can be 0.004 or more and 0.02 or less, or from about 0.004 to about 0.02.

According to some embodiments of the present disclosure, the saturation adjusting part can be configured to adjust the saturation so that the color difference value calculated by the color difference comparing part satisfies the predetermined reference color difference range, and the color difference comparing part can be configured to output the second data when the calculated color difference value satisfies the predetermined reference color difference range.

According to some embodiments of the present disclosure, the output data can further include a third data of the other area different from the afterimage area.

According to some embodiments of the present disclosure, the predetermined gain value can be 0.1 or more to 0.3 or less, or from about 0.1 to about 0.3.

According to some embodiments of the present disclosure, the afterimage detecting part can be further configured to accumulate and average the data difference between a previous frame and a current frame in the plurality of pixels by the image data, to thereby obtain an average frame of the data difference, generate an afterimage area mask from the average frame of the data difference, and detect and output the first data of the afterimage area from the image data of the current frame by using the afterimage area mask.

According to some embodiments of the present disclosure, the display apparatus can further comprise a storage part configured to store the first data and the second data in a lookup table form.

It will be apparent to those skilled in the art that various substitutions, modifications, and variations are possible within the scope of the present disclosure without departing from the technical idea and scope of the present disclosure. Therefore, the scope of the present disclosure is represented by the following claims, and all changes or modifications derived from the meaning, range and equivalent concept of the claims should be interpreted as being included in the scope of the present disclosure.

What is claimed is:

1. A display apparatus, comprising:

an afterimage detecting part configured to detect a first data of an afterimage area from an image data;

a saturation adjusting part configured to adjust a saturation of the first data of the afterimage area detected by the afterimage detecting part, and convert the first data into a second data; and a display panel including a plurality of pixels configured to display a data including the second data output from the saturation adjusting part, wherein the saturation adjusting part reduces the saturation of the first data so that a color difference value between the first data and the second data is included in a predetermined reference color difference range being from about 0.004 to about 0.02, wherein the first data includes a first red data, a first green data, and a first blue data, wherein the second data includes a second red data, a second green data, and a second blue data, wherein a maximum value among the second red data, the second green data, and the second blue data is less than a maximum value among the first red data, the first green data, and the first blue data, and wherein a minimum value among the second red data, the second green data, and the second blue data is greater than a minimum value among the first red data, the first green data, and the first blue data.

2. The display apparatus of claim 1, wherein the afterimage detecting part detects the first data of the afterimage area by accumulating a data difference between adjacent frames of each of the plurality of pixels.

3. The display apparatus of claim 2, wherein the saturation adjusting part is configured to:

calculate a first saturation information value from the first data of the afterimage area;

adjust the first saturation information value to a second saturation information value according to a correction value; and convert the data including the second saturation information value into the second data.

4. The display apparatus of claim 3, further comprising a storage part configured to:

store the correction value and the first saturation information value corresponding to the first data in a lookup table form, or store the first data and the second data in a lookup table form.

5. The display apparatus of claim 2, wherein the saturation adjusting part is configured to:

calculate a first saturation information value from the first data of the afterimage area;

adjust the first saturation information value to a second saturation information value according to a correction value;

convert the data including the second saturation information value into the second data; and calculate the color difference value between the first data and the second data.

6. The display apparatus of claim 5, further comprising a storage part configured to:

store the correction value and the second saturation information value having the color difference value corresponding to the first saturation information value in a lookup table form, or store the first data and the second data in a lookup table form.

7. The display apparatus of claim 2, wherein the saturation adjusting part is configured to:

calculate a first uniform chromaticity diagram and a first saturation information value by converting the first data of the afterimage area in a color space conversion;

adjust the first saturation information value to a second saturation information value according to a correction value;

calculate a second uniform chromaticity diagram and the second data by converting the second saturation information value in a color space inverse conversion; and calculate a color difference value by comparing the first uniform chromaticity diagram with the second uniform chromaticity diagram.

8. The display apparatus of claim 7, further comprising a storage part configured to store the first uniform chromaticity diagram and the second uniform chromaticity diagram in a lookup table form.

9. The display apparatus of claim 1, further comprising:

an image supply part including the image detecting part and the saturation adjusting part, and configured to supply the second data of the afterimage area and third data of another area different from the afterimage area;

a timing controller configured to output the data received from the image supply part;

a data driver configured to convert the data supplied from the timing controller into data voltages, and apply the data voltages to data lines of the display panel; and a gate driver configured to drive gate lines of the display panel according to a control of the timing controller.

10. The display apparatus of claim 1, further comprising:

an image supply part configured to supply the image data;

a timing controller including the afterimage detecting part and the saturation adjusting part, and configured to supply the second data of the afterimage area and third data of another area different from the afterimage area;

a data driver configured to convert the data supplied from the timing controller into data voltages, and apply the data voltages to data lines of the display panel; and a gate driver configured to drive gate lines of the display panel according to a control of the timing controller.

11. The display apparatus of claim 1, further comprising:

an image supply part configured to supply the image data;

a timing controller configured to output the image data received from the image supply part;

a data driver including the afterimage detecting part and the saturation adjusting part, and configured to convert the second data of the afterimage area and third data of another area different from the afterimage area into data voltages, and output the data voltages to data lines of the display panel; and a gate driver configured to drive gate lines of the display panel according to a control of the timing controller.

12. The display apparatus of claim 3, wherein the correction value is a gain value which is from about 0.1 to about 0.3.

13. The display apparatus of claim 2, wherein the afterimage detecting part accumulates and averages the data difference between a previous frame and a current frame in the plurality of pixels by the image data, to thereby obtain an average frame of the data difference, so as to detect the first data of the afterimage area.

14. The display apparatus of claim 13, wherein the afterimage detecting part generates an afterimage area mask from the average frame of the data difference, and detects and outputs the first data of the afterimage area from the image data of the current frame by using the afterimage area mask.

15. A display apparatus, comprising:

a display panel including a plurality of pixels;

a controller configured to:

receive an image data;

detect a first data of an afterimage area from the image data by accumulating a data difference for each pixel between adjacent frames by the image data;

adjust a saturation correction value based on the first data of the afterimage area;

correct the first data of the afterimage area to a second data based on the saturation correction value; and supply an output data including the second data; and a circuit part configured to provide data signals to the plurality of pixels based on the output data supplied from the controller, wherein when the controller corrects the first data of the afterimage area to a second data based on the saturation correction value, the controller reduces a saturation of the first data so that a color difference value between the first data and the second data is included in a predetermined reference color difference range being from about 0.004 to about 0.02, wherein the first data includes a first red data, a first green data, and a first blue data, wherein the second data includes a second red data, a second green data, and a second blue data, wherein a maximum value among the second red data, the second green data, and the second blue data is less than a maximum value among the first red data, the first green data, and the first blue data, and wherein a minimum value among the second red data, the second green data, and the second blue data is greater than a minimum value among the first red data, the first green data, and the first blue data.

16. The display apparatus of claim 15, wherein the controller includes:

an afterimage detecting part configured to detect the first data of the afterimage area from the image data; and a saturation adjusting part configured to determine the saturation correction value for the first data of the afterimage area, and correct the first data to the second data.

17. The display apparatus of claim 16, wherein the afterimage detecting part masks an area in which an accumulated average value of data difference for each pixel between the adjacent frames is smaller than a reference value from the image data, and detects a data of the masked area as the first data.

18. The display apparatus of claim 16, wherein the saturation correction value is a predetermined gain value.

19. The display apparatus of claim 15, wherein the controller includes:

an afterimage detecting part configured to detect the first data of the afterimage area from the image data;

a first conversion part configured to convert the first data into first color space data by converting the first data in a color space conversion;

a first calculation part configured to calculate a first uniform chromaticity diagram from the first data of the first conversion part;

a saturation adjusting part configured to adjust the saturation of the first color space data based on the saturation correction value, and correct the first color space data to second color space data;

a second conversion part configured to convert the second color space data to the second data by a color space inverse conversion;

a second calculation part configured to calculate a second uniform chromaticity diagram from the second data; and a color difference comparing part configured to calculate a color difference value between the first uniform chromaticity diagram of the first calculation part and a second uniform chromaticity diagram of the second calculation part, and compare the calculated color difference value with a predetermined reference color difference range.

20. The display apparatus of claim 19, wherein the saturation adjusting part is configured to adjust the saturation so that the color difference value calculated by the color difference comparing part satisfies the predetermined reference color difference range, and wherein the color difference comparing part is configured to output the second data when the calculated color difference value satisfies the predetermined reference color difference range.

21. The display apparatus of claim 15, wherein the output data further includes a third data of the other area different from the afterimage area.

22. The display apparatus of claim 18, wherein the predetermined gain value is from about 0.1 to about 0.3.

23. The display apparatus of claim 16, wherein the afterimage detecting part is further configured to accumulate and average the data difference between a previous frame and a current frame in the plurality of pixels by the image data, to thereby obtain an average frame of the data difference, generate an afterimage area mask from the average frame of the data difference, and detect and output the first data of the afterimage area from the image data of the current frame by using the afterimage area mask.

24. The display apparatus of claim 19, wherein the afterimage detecting part is further configured to accumulate and average the data difference between a previous frame and a current frame in the plurality of pixels by the image data, to thereby obtain an average frame of the data difference, generate an afterimage area mask from the average frame of the data difference, and detect and output the first data of the afterimage area from the image data of the current frame by using the afterimage area mask.

25. The display apparatus of claim 15, further comprising a storage part configured to store the first data and the second data in a lookup table form.

26. The display apparatus of claim 1, wherein the afterimage detecting part is configured to detect the first data of the afterimage area by accumulating and averaging a data difference between adjacent frames among a plurality of frames including three or more frames to obtain an average frame of the data difference, and generating an afterimage area mask from the average frame of the data difference.

27. The display apparatus of claim 15, wherein the controller is configured to detect the first data of the afterimage area by accumulating and averaging a data difference between adjacent frames among a plurality of frames including three or more frames to obtain an average frame of the data difference, and generating an afterimage area mask from the average frame of the data difference.

* * * * *